United States Patent
Nonoyama et al.

(10) Patent No.: US 7,181,230 B2
(45) Date of Patent: Feb. 20, 2007

(54) MOBILE UNIT INFORMATION SHARING SYSTEM

(75) Inventors: Yasumasa Nonoyama, Tokyo (JP); Yoshiko Maeda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 150 days.

(21) Appl. No.: 11/012,233

(22) Filed: Dec. 16, 2004

(65) Prior Publication Data

US 2006/0003777 A1 Jan. 5, 2006

(30) Foreign Application Priority Data

Jun. 30, 2004 (JP) ............................. 2004-194259

(51) Int. Cl.
*H04Q 7/20* (2006.01)
*H04B 7/185* (2006.01)

(52) U.S. Cl. ............... 455/457; 455/456.3; 342/357.08

(58) Field of Classification Search ................ 455/457, 455/456.1, 456.3; 342/357.08; 340/988–996
See application file for complete search history.

(56) References Cited

U.S. PATENT DOCUMENTS

| 5,450,329 | A | 9/1995 | Tanner |
| 5,453,987 | A | 9/1995 | Tran |
| 6,532,364 | B1 | 3/2003 | Uchida et al. |
| 6,690,283 | B2 | 2/2004 | Nemoto et al. |
| 7,084,809 | B2 * | 8/2006 | Hockley et al. ....... 342/357.08 |
| 2004/0039504 | A1 | 2/2004 | Coffee et al. |
| 2005/0054352 | A1 * | 3/2005 | Karaizman ............... 455/456.3 |

FOREIGN PATENT DOCUMENTS

| GB | 2 362 292 | 11/2001 |
| JP | 7-260920 | 10/1995 |
| JP | 08-130774 | 5/1996 |
| JP | 2001-043500 | 2/2001 |
| JP | 2001-188837 | 7/2001 |
| JP | 2001-289642 | 10/2001 |
| JP | 2001-312792 | 11/2001 |
| JP | 2002-51455 | 2/2002 |
| JP | 2002-077199 | 3/2002 |

* cited by examiner

*Primary Examiner*—George Eng
*Assistant Examiner*—Kiet Doan
(74) *Attorney, Agent, or Firm*—Leydig, Voit & Mayer, Ltd.

(57) ABSTRACT

A mobile unit information sharing system with which it is possible by wireless communications and without providing a communications control station to share not only voice data but also position information of multiple mobile stations and business information such as images formed in the course of business and instructions and the like. A base station and multiple mobile stations each, by a time-sharing synchronous wireless modem device, acquire position information for themselves and time information via a GPS antenna and transmit their station position information via a wireless installation using a wireless frequency common to all the stations and with timing determined, on the basis of the acquired time information, so that their station position information does not collide with position information transmissions from other stations.

18 Claims, 27 Drawing Sheets

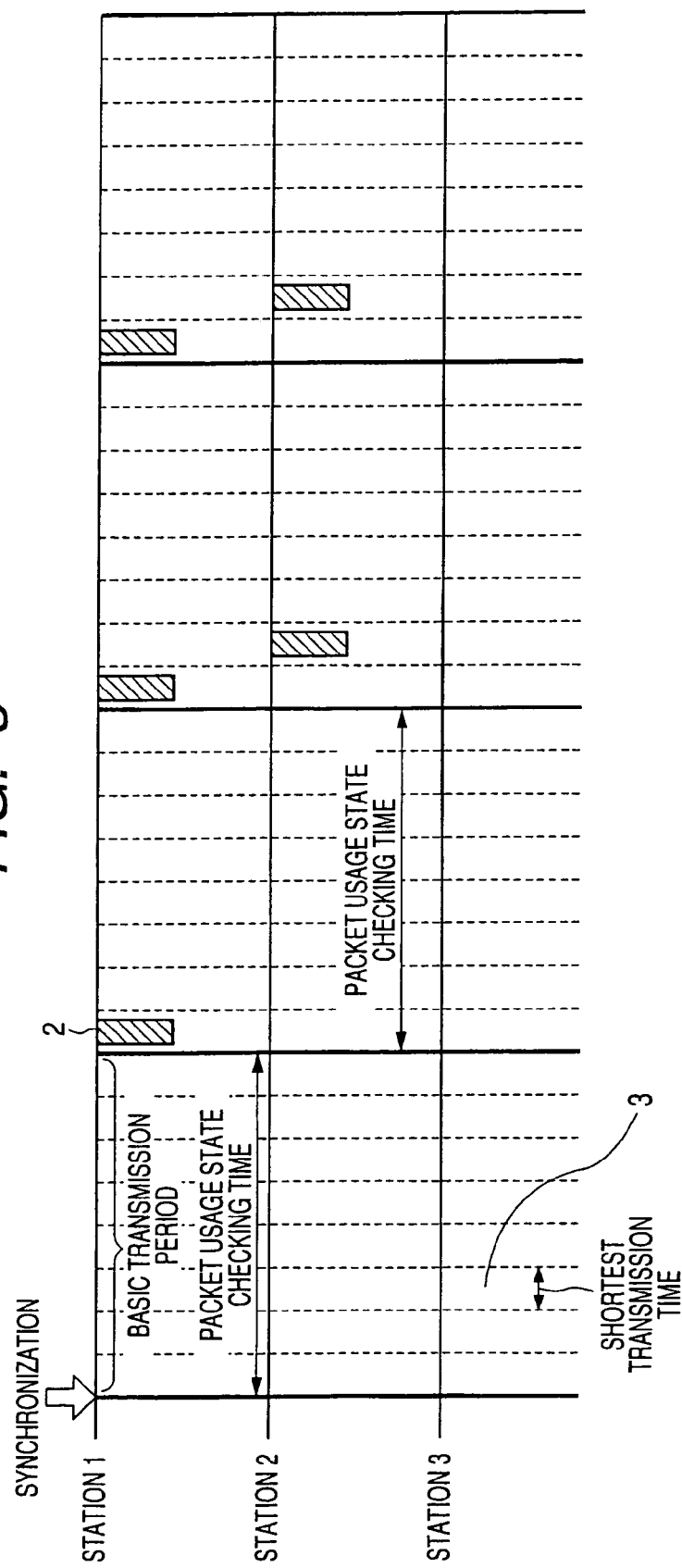

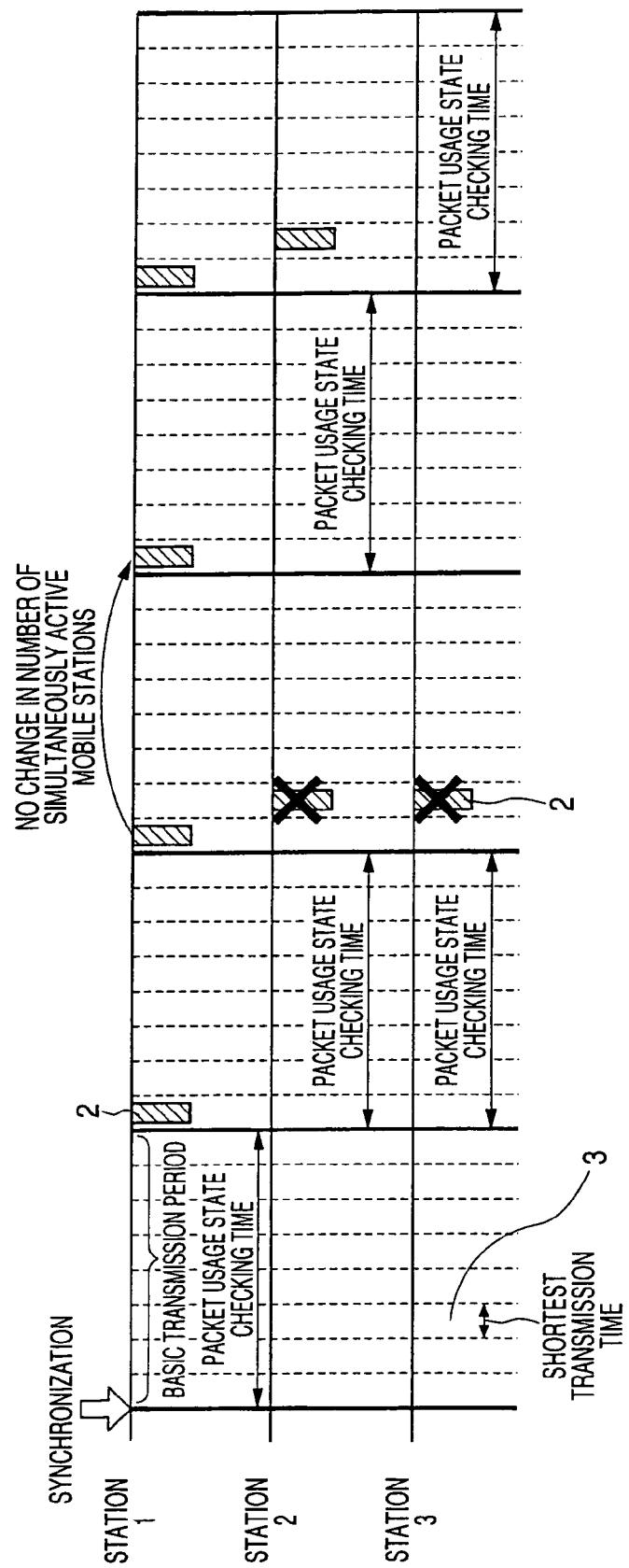

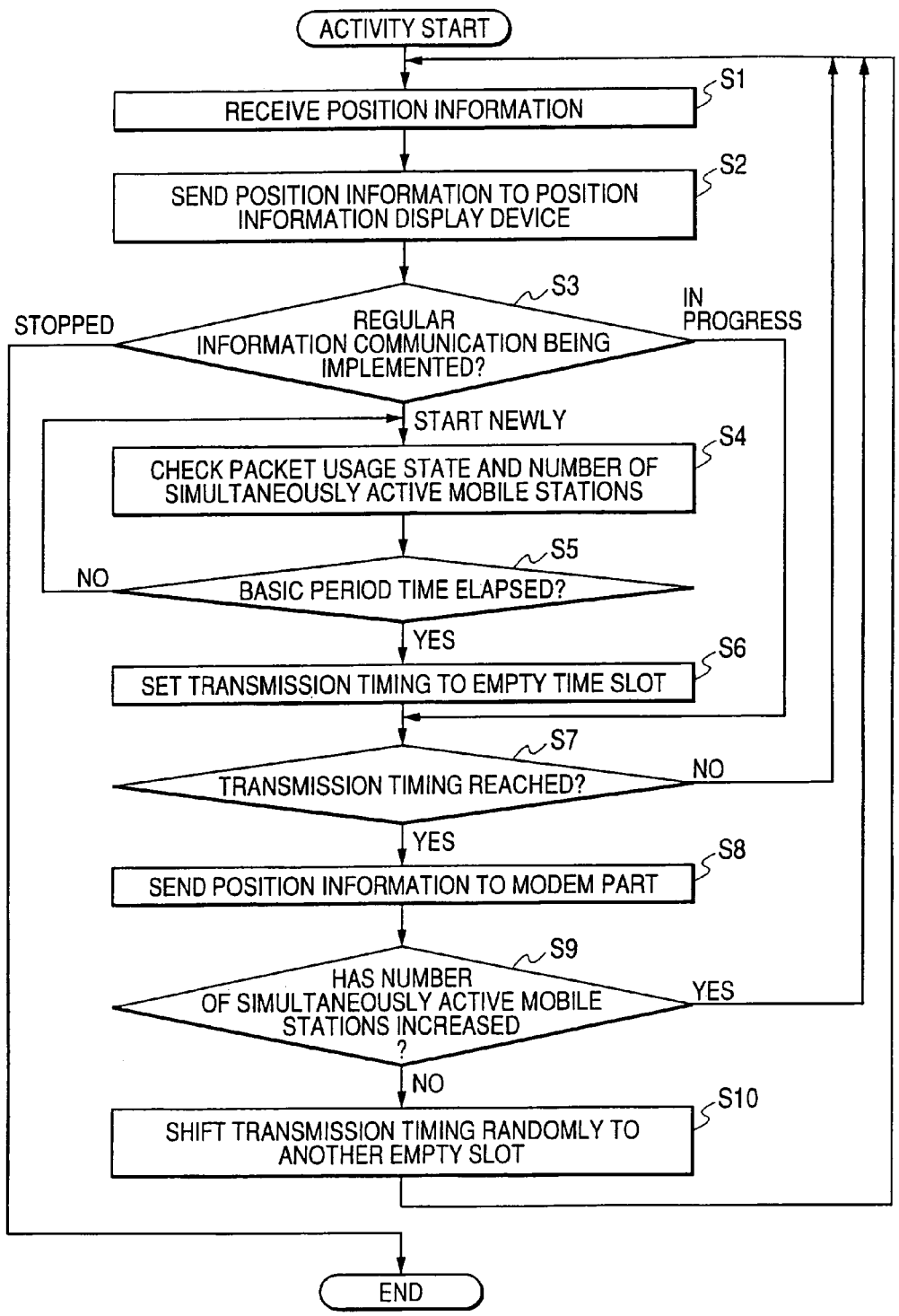

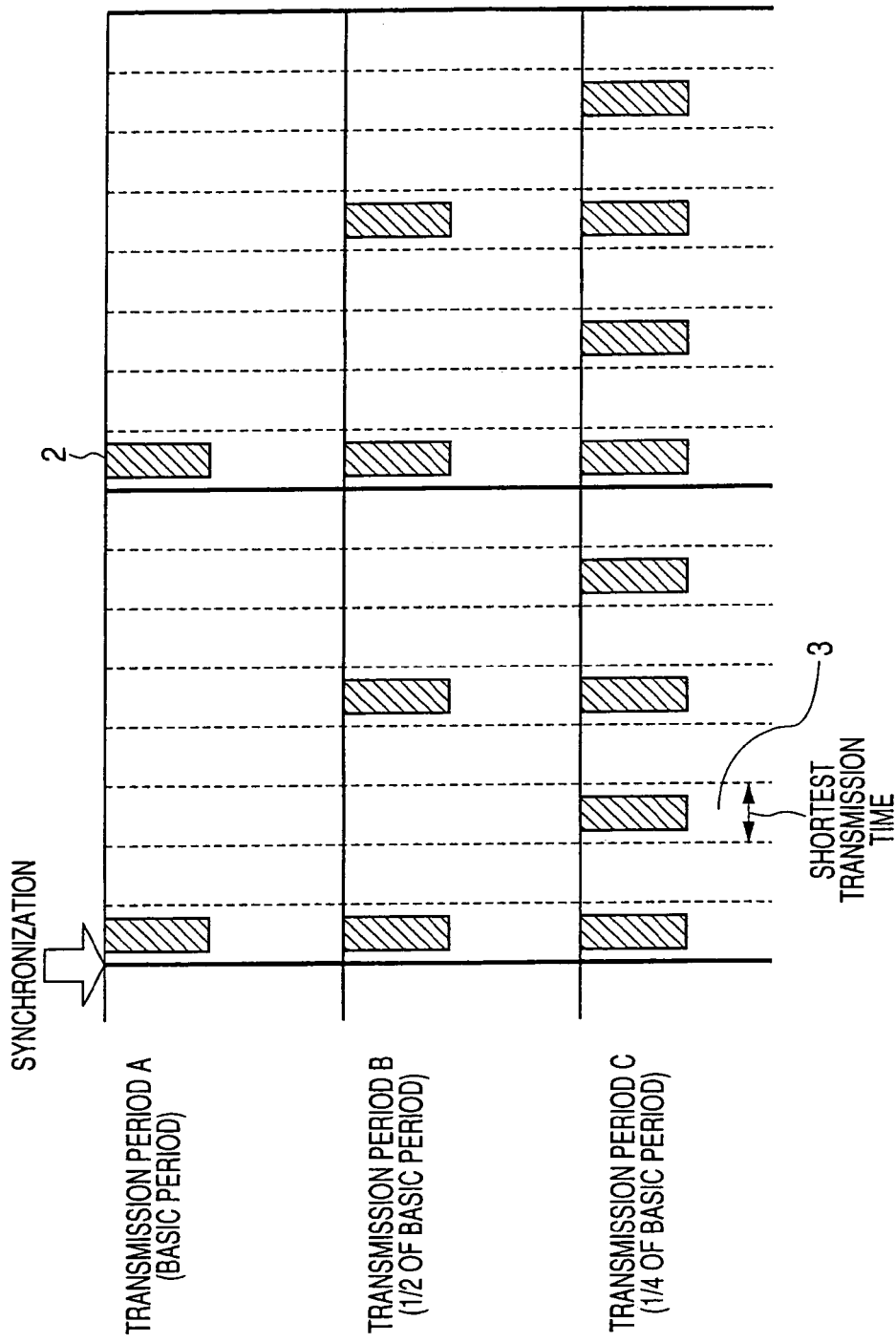

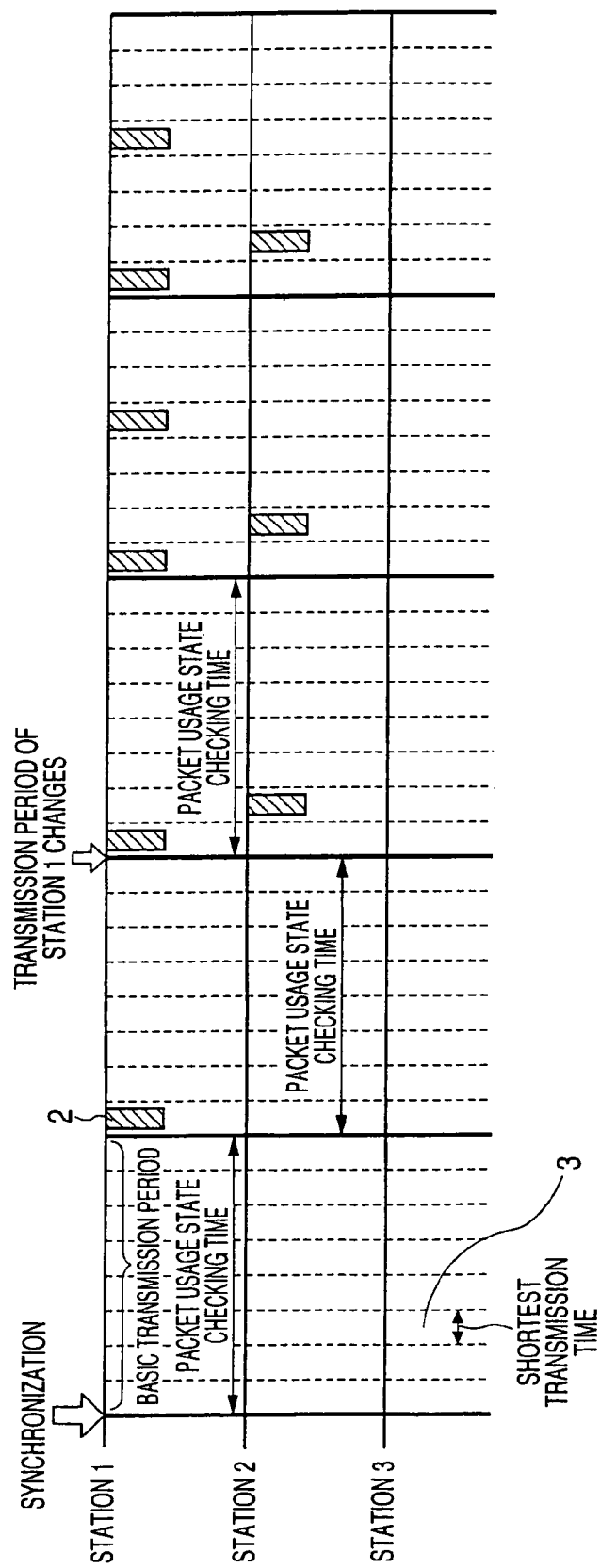

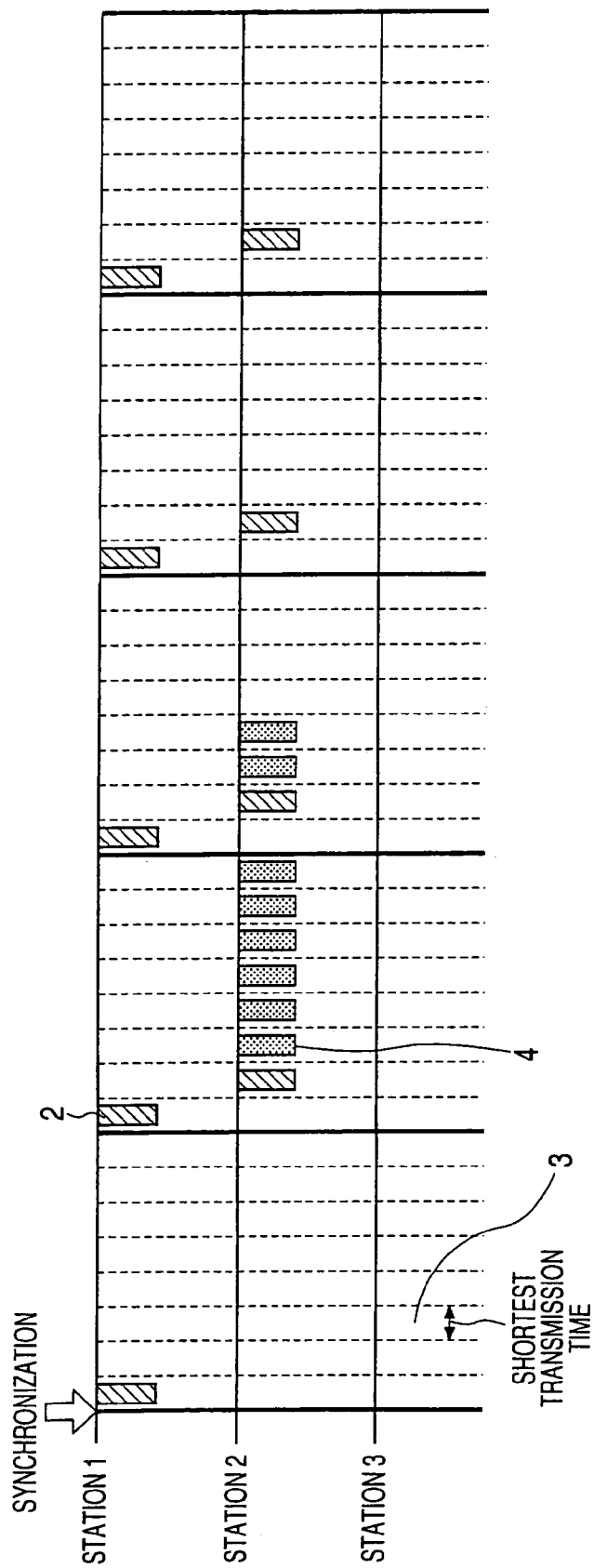

FIG. 20

ACTIVE MOBILE UNITS TABLE

| NO. | PATH TRAVELED | MOBILE UNIT NAME | ACTIVITY STATUS | ACTIVITY REPORT | TOTAL TIME HR | DATE | TIME | LATITUDE | LONGITUDE | ALTITUDE | ORIENTATION |
|---|---|---|---|---|---|---|---|---|---|---|---|
| 4 | 2 | MOBILE UNIT 1 | WORKING | STARTING RESCUE | 0:54 | 2004/6/22 | 16:16:15 | 035-34.41 | 139-46.58 | 323 | 144 |
| 3 | | | | TARGET SIGHTED | 0:53 | 2004/6/22 | 16:15:38 | 035-34.12 | 139-46.19 | 331 | 152 |
| 2 | | | SEARCHING | STARTING SEARCH | 0:35 | 2004/6/22 | 15:57:22 | 035-34.17 | 139-46.32 | 10 | 226 |
| 1 | | | ON WAY TO SITE | SETTING OFF | 0:00 | 2004/6/22 | 15:22:11 | 035-34.10 | 139-46.17 | 10 | 226 |
| 9 | | | FINISHED | RETURNED TO BASE | 2:32 | 2004/6/22 | 16:12:20 | 035-34.10 | 139-46.17 | 230 | 46 |
| 8 | | | RETURNING TO BASE | LEAVING SITE | 1:48 | 2004/6/22 | 15:18:22 | 035-37.45 | 139-08.58 | 620 | 132 |
| 7 | | | | RESCUE COMPLETED | 1:43 | 2004/6/22 | 15:13:22 | 035-37.12 | 139-08.19 | 630 | 122 |
| 6 | 1 | MOBILE UNIT 2 | WORKING | STARTING RESCUE | 1:32 | 2004/6/22 | 15:02:22 | 035-36.13 | 139-05.20 | 250 | 154 |
| 5 | | | | FINISHED PHOTOGRAPHY | 1:23 | 2004/6/22 | 14:53:23 | 035-37.14 | 139-06.21 | 280 | 135 |
| 4 | | | | STARTING PHOTOGRAPHY | 0:54 | 2004/6/22 | 14:24:24 | 035-39.15 | 139-06.22 | 340 | 144 |
| 3 | | | | TARGET SIGHTED | 0:53 | 2004/6/22 | 14:23:24 | 035-37.15 | 139-05.22 | 340 | 144 |
| 2 | | | SEARCHING | STARTING SEARCH | 0:35 | 2004/6/22 | 13:35:20 | 035-34.10 | 139-46.17 | 10 | 226 |
| 1 | | | ON WAY TO SITE | SETTING OFF | 0:00 | 2004/6/22 | 13:00:20 | 035-34.10 | 139-16.17 | 10 | 226 |

12 MOVING UNIT POSITION
14 SYMBOL
13 PATH TRAVELED 12  14  13  15
IMAGE LINKED
TO SYMBOL

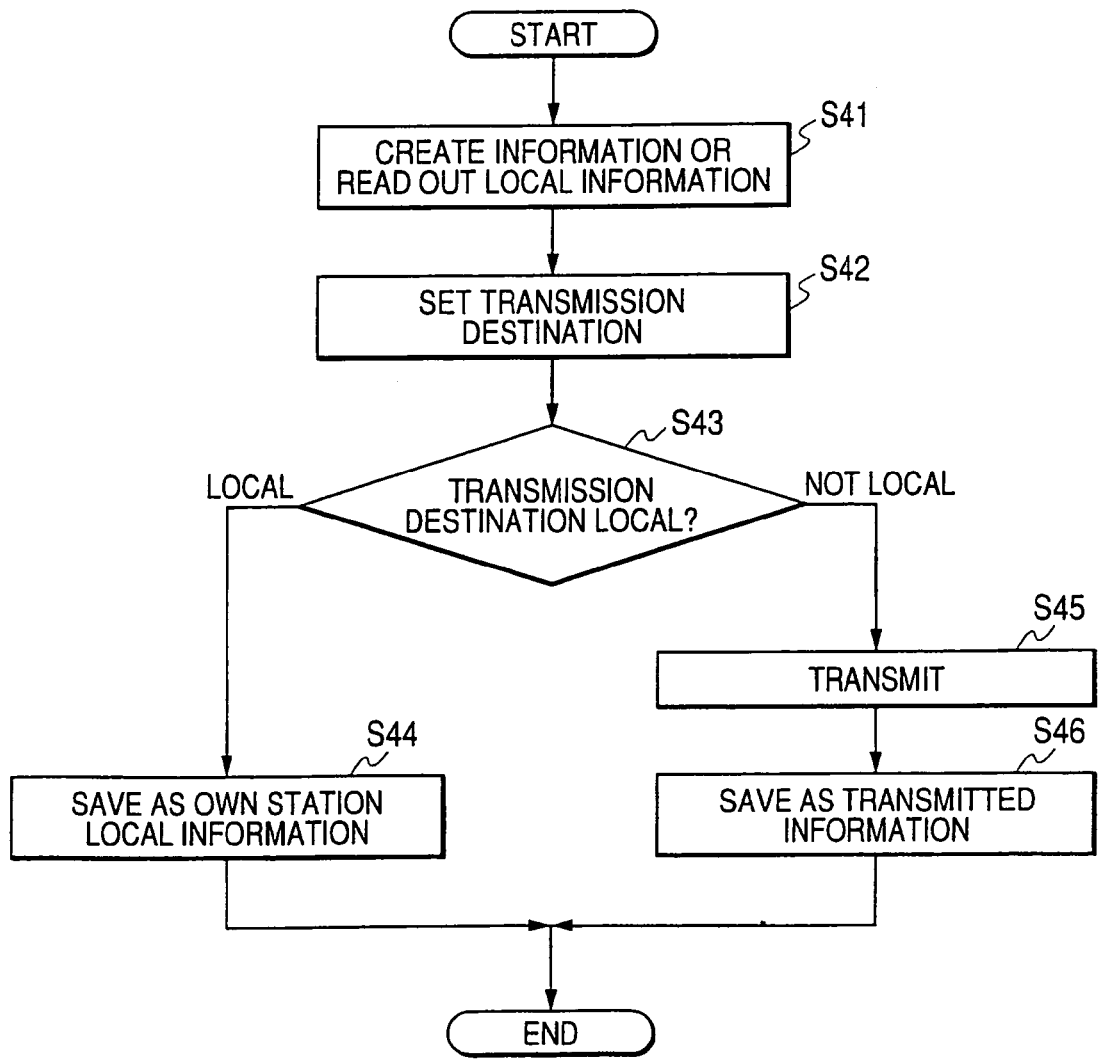

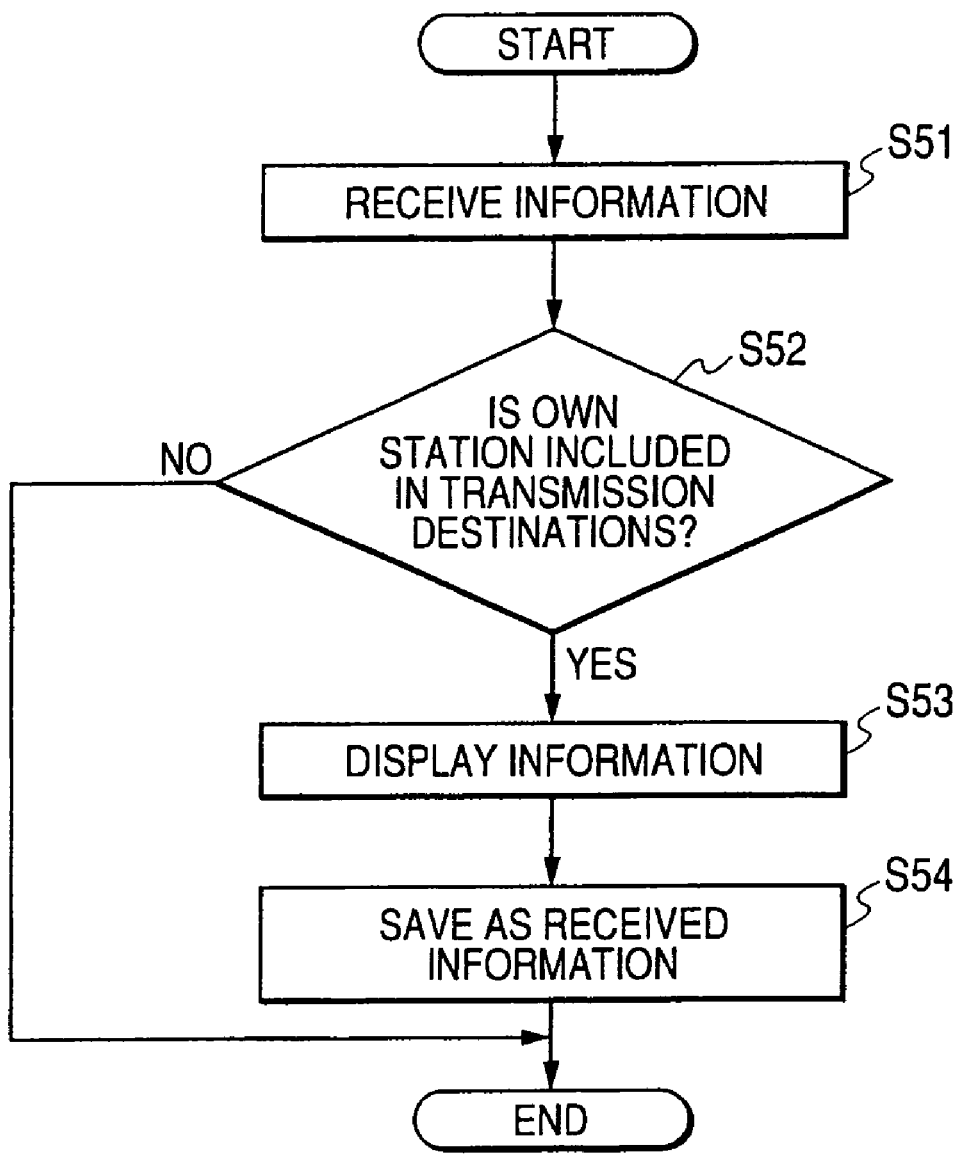

MOBILE UNIT INFORMATION SHARING SYSTEM

BACKGROUND OF THE INVENTION

This invention relates to a mobile unit information sharing system wherein, among multiple mobile units (mobile stations) and a base station supervising the movements of the mobile units, position information of the mobile units is shared among the stations using a common wireless frequency.

Mobile unit communication systems of related art wherein voice signals are transmitted and received using a common wireless frequency include individual mobile unit information management systems in which information on individual mobile units is managed by a central station. An example of this appears in Japanese Patent Laid-open Publication JP-A-2001-43500 (Patent Document 1).

And in information sharing systems using wireless communications of related art, in communicating information such as the positions and activity states of multiple mobile units, and site images and so on, to avoid communication collisions and information bias, information is shared by being collected and managed by an information sharing server at a headquarters and distributed from there to the mobile units. Examples of this appear in Japanese Patent Laid-open Publication JP-A-2001-18837 and JP-A-2001-289642 (Patent Documents 2, 3).

Also, data transfer systems are known which perform time-sharing transmission control wherein multiple terminal stations are provided with a common reference time base and by a predetermined time within the period of the reference time base being allocated to each terminal station as a unique transmission timing-the overlapping of transmission timings in communications among the multiple stations is avoided without communications control being received from a base station. An example of this appears in Japanese Patent Laid-open Publication JP-A-08-130774 (Patent Document 4).

With a mobile unit communication system that transmits and receives voice signals using a common wireless frequency of related art such as that of JP-A-2001-43500 (Patent Document 1), although individual information on the mobile units can be managed at the central station, there has been the problem that on the mobile unit side it is not possible to check position information of other stations on a display and information of the mobile units cannot be shared among the stations.

In information sharing systems using wireless communications of related art such as those of JP-A-2001-188837 and JP-A-2001-289642 (Patent Documents 2, 3), because as mentioned above an information sharing server manages the shared information and controls the communications, there has been the problem that when this server fails to function normally, information sharing not only between the headquarters and the mobile stations but also among the mobile stations becomes difficult.

And when as in JP-A-08-130774 (Patent Document 4) and the like time-sharing transmission control is carried out wherein multiple terminal stations are provided with a common reference time base and by a predetermined time within the period of the reference time base being allocated to each terminal station as a unique transmission timing the overlapping of transmission timings (communication collisions) in communications among the multiple stations is avoided without communications control being received from a base station, because a predetermined time within the period of the reference time base is allocated to each terminal station, it is not possible for the transmission period to be changed as necessary. And, when transmitting high-volume data such as images, even if there are empty time slots that no other station is using, there has been the problem that because data can only be transmitted within the transmission periods allocated to the stations, the communications slots cannot be utilized effectively, and information cannot be shared efficiently.

SUMMARY OF THE INVENTION

It is therefore an object of the present invention to provide a mobile unit information sharing system with which it is possible by wireless communications and without providing a communications control station to efficiently share not only voice data but also position information of multiple mobile stations and business information such as images shot in the course of business and instructions and the like, and with which movement tracking and management of multiple mobile units is possible by each station displaying on a map screen not only its own position but also the positions of other mobile units obtained through communications together with their paths traveled.

To achieve these and other objects, the present invention provides a mobile unit information sharing system in which a base station and multiple mobile stations carry out wireless communications and the base station and the mobile stations each have a wireless installation for executing wireless communications among the stations using a common wireless frequency, a time-sharing synchronous wireless modem device for receiving position information of the own station through a GPS antenna and transmitting this received own station position information to the other stations via the wireless installation and receiving position information of the other stations from the wireless installation, and a position information display device for receiving own station position information and other station position information from this time-sharing synchronous wireless modem device and recording it as shared data and displaying the position information on a map, wherein the time-sharing synchronous wireless modem device is made up of a GPS receiver part for receiving own station position information through the GPS antenna, a wireless modem part for modulating the own station position information received by this GPS receiver part to a data form used by the wireless installation and demodulating the other station position information received by the wireless installation from the data form used by the wireless installation, and a first computing part for transmitting the own station position information received from the GPS receiver part and the other station position information demodulated by the wireless modem part to the position information display device and transmitting the own station position information to the other stations via the wireless installation with transmission timing determined so that communication collisions do not occur, each station sharing position information by transmitting and receiving position information to and from the other stations.

With this invention, because, as described above, a base station and multiple mobile stations carry out wireless communications and the base station and the mobile stations each have a wireless installation for executing wireless communications among the stations using a common wireless frequency, a time-sharing synchronous wireless modem device for receiving position information of the own station through a GPS antenna and transmitting this received own station position information to the other stations via the wireless installation and receiving position information of the other stations from the wireless installation, and a position information display device for receiving own station position information and other station position information from this time-sharing synchronous wireless modem device and recording it as shared data and displaying the position information on a map, and the time-sharing synchronous wireless modem device is made up of a GPS receiver part for receiving own station position information through the GPS antenna, a wireless modem part for modulating the own station position information received by this GPS receiver part to a data form used by the wireless installation and demodulating the other station position information received by the wireless installation from the data form used by the wireless installation, and a first computing part for transmitting the own station position information received from the GPS receiver part and the other station position information demodulated by the wireless modem part to the position information display device and transmitting the own station position information to the other stations via the wireless installation with transmission timing determined so that communication collisions do not occur, each station sharing position information by transmitting and receiving position information to and from the other stations, the mobile stations can conduct time-sharing synchronous communications without the mediation of a communications control station, even when communications with the base station are cut off, without communication collisions between the mobile stations occurring, information can be shared among the multiple mobile stations by the communication of position information being carried out automatically, and by means of the position information display device not only the own station position but also the positions of the other stations which have conducted transmission and reception can be confirmed on a map.

BRIEF DESCRIPTION OF THE DRAWINGS

FIG. 5 is a view illustrating position information packet transmission timing in a mobile unit information sharing system according to a first preferred embodiment of the invention;

FIG. 6 is a view showing transmission timing after a collision of position information packets in a mobile unit information sharing system according to a first preferred embodiment of the invention;

FIG. 7 is a flow chart showing position information transmission processing of a computing part of a time-sharing synchronous wireless modem device of a mobile unit information sharing system according to a first preferred embodiment of the invention;

FIG. 8 is a view illustrating different position information transmission periods in a mobile unit information sharing system according to a second preferred embodiment of the invention;

FIG. 9 is a view illustrating a varied position information transmission period in a mobile unit information sharing system according to a second preferred embodiment of the invention;

FIG. 11 is a view illustrating transmission timing of image data in a mobile unit information sharing system according to a third preferred embodiment of the invention;

FIG. 20 is a view showing an example of an activity history table in a mobile unit information sharing system according to a ninth preferred embodiment of the invention;

FIG. 28 is a flow chart showing transmission processing of information for which a transmission destination has been set in a mobile unit information sharing system according to an eighteenth preferred embodiment of the invention; and FIG. 29 is a flow chart showing reception processing of information for which a transmission destination was set in a mobile unit information sharing system according to an eighteenth preferred embodiment of the invention.

DETAILED DESCRIPTION OF THE PREFERRED EMBODIMENTS

First Preferred Embodiment

A first preferred embodiment of the invention will now be described on the basis of the drawings.

Figure 1:
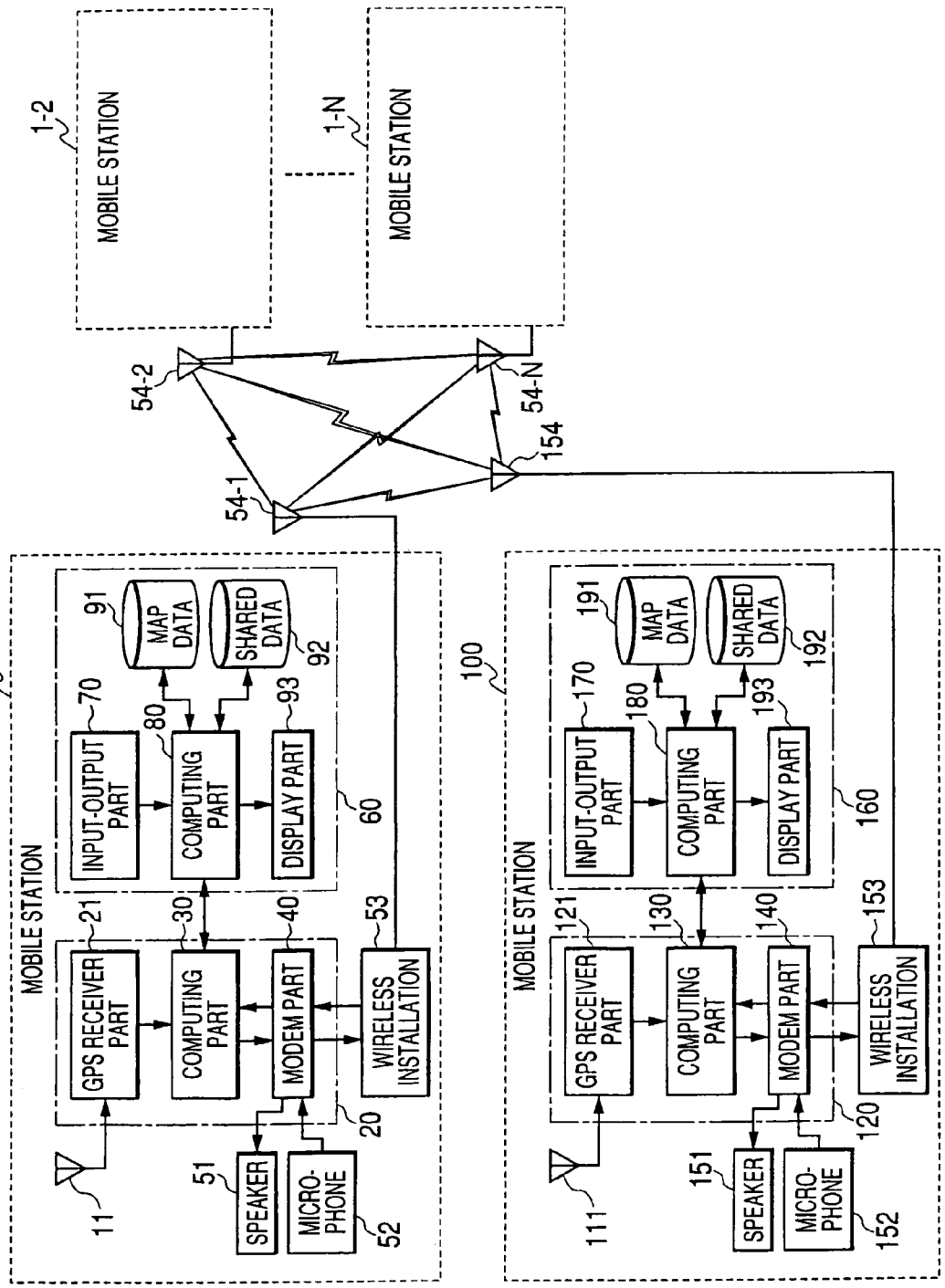
FIG. 1 is a block diagram showing a mobile unit information sharing system according to a first preferred embodiment of the invention.

FIG. 1 is a block diagram showing a first preferred embodiment of a mobile unit information sharing system according to the invention.

In FIG. 1, mobile stations 1 (1-1, 1-2, ..., 1-N) and a base station 100 conduct wireless communications via respective communication antennas 54 (54-1, 54-2, ... 54-N) and 154.

The mobile station 1, besides the communications antenna 54, is made up of a GPS antenna 11, a time-sharing synchronous wireless modem device 20, a speaker 51, a microphone 52, a wireless installation 53, and a position information display device 60. These will now be discussed in turn.

The GPS antenna 11 receives GPS position information and time information. Here, position information is information made up of the latitude, longitude, direction of movement and speed of movement of the own mobile station (hereinafter, own station). In the following description, position information and time information together will be expressed as position information.

The time-sharing synchronous wireless modem device 20 is made up of a GPS receiver part 21, a computing part 30 (first computing part) and a wireless modem part 40, and is connected to the position information display device 60 by an Ethernet (registered trade mark). The GPS receiver part 21 acquires own station position information (including time information; and so hereinafter) from the GPS antenna 11, and transmits it to the computing part 30 every 1 second. The computing part 30 transmits this position information to a computing part 80 of the position information display device 60 every 1 second, and also determines a data transmission timing of regular position information communication so as to avoid communication collisions and transmits the own station position information to the wireless modem part 40 with this timing. And, the computing part 30 transmits received data constituting position information of other stations converted in the wireless modem part 40 to the computing part 80 of the position information display device 60.

At times of data transmission of own station position information, the wireless modem part 40 converts the data into a form in which it can be transmitted by the wireless installation 53 and passes it to the wireless installation 53. Voice communication can be conducted by means of the microphone 52 and the speaker 51 connected to this wireless modem part 40. The wireless modem part 40 also converts received data constituting other station position information received by the wireless installation 53 into a form in which it can be digitally processed in the computing part 30.

The wireless installation 53 is an ordinary wireless transceiver for conducting wireless communication with other stations. Even if it is an analog wireless transceiver for voice communications, because data conversion is carried out by the wireless modem part 40, communication of digital information such as position information and images is possible.

The speaker 51 receives an output of the wireless modem part 40 and outputs speech.

The microphone 52 can be switched to a transmitting state by an associated PTT (Press-To-Talk) push-button switch being pressed, whereby speech is inputted to the wireless modem part 40.

The position information display device 60 is made up of an input-output part 70, the computing part 80 (second computing part), map data 91, shared data 92 and a display part 93. In the input-output part 70, by means of a GUI (Graphical User Interface) function, a basic period of regular position information communication is set. This basic period is set so as to be common to all of the stations. Also, in each station, a station ID is set.

The computing part 80 holds position information received from the computing part 30 of the time-sharing synchronous wireless modem device 20 in the shared data 92, processes the map data 91 and displays the own station position information on the display part 93 so that the own station position is at the center of the map, and also displays the positions of other stations obtained by communication on the map.

As the position information display device 60, depending on the utilization form of the respective mobile station, a desktop PC, a notebook PC or a tablet PC or the like is used.

The base station 100 also has the same construction as the mobile station 1.

That is, it is made up of a GPS antenna 111, a time-sharing synchronous wireless modem, device 120, a speaker 151, a microphone 152, a wireless installation 153 and a position information display device 160; the time-sharing synchronous wireless modem device 120 has a GPS receiver part 121, a computing part 130 and a wireless modem part 140; and the position information display device 160 has an input-output part 170, a computing part 180, map data 191, shared data 192 and a display part 193. The internal constructions of the computing part 130, the wireless modem part 140, the input-output part 170 and the computing part 180 are also the same as those shown in FIG. 2 and FIG. 3.

Figure 2:
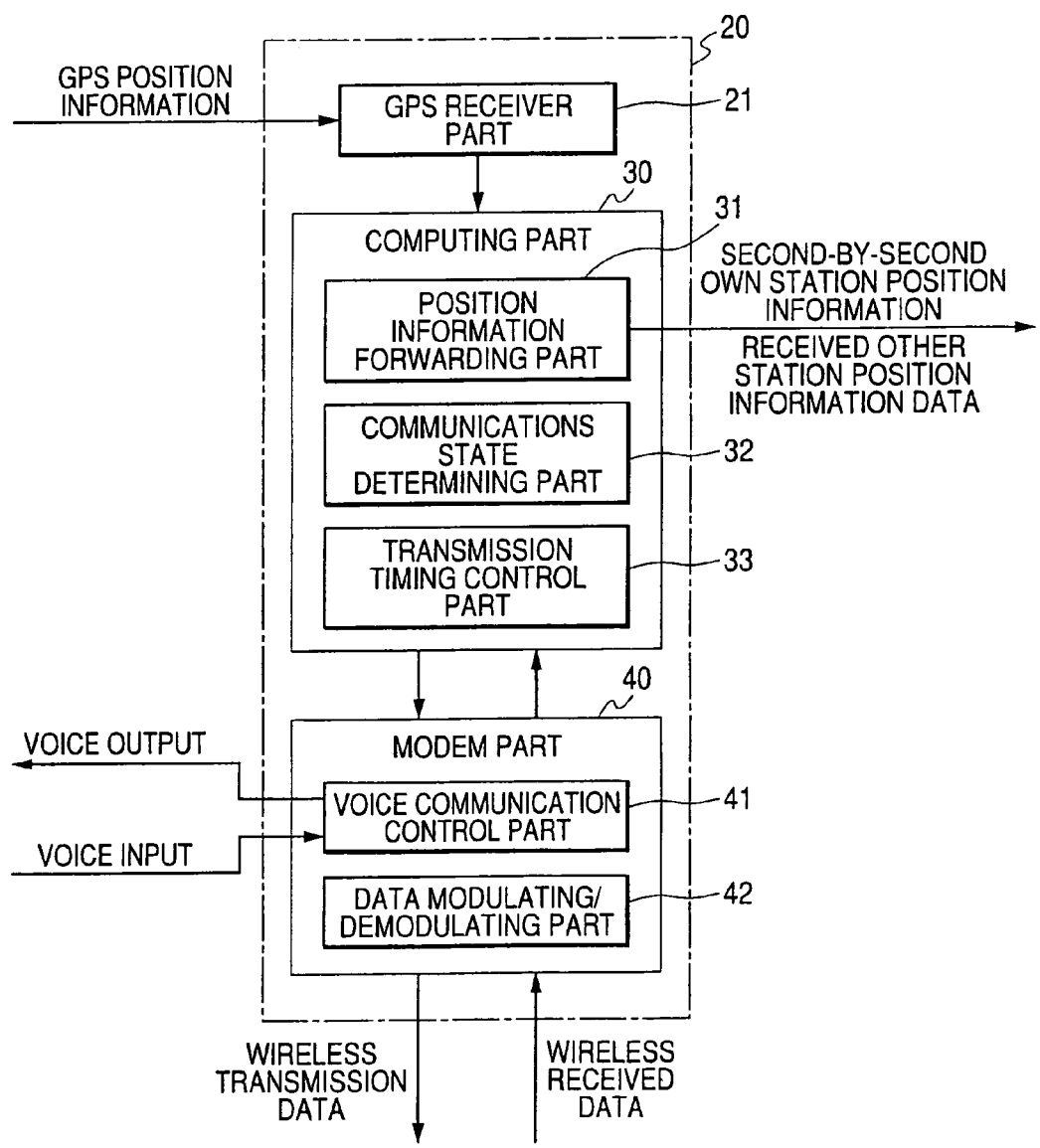
FIG. 2 is a block diagram showing a time-sharing synchronous wireless modem device of a mobile unit information sharing system according to a first preferred embodiment of the invention.

FIG. 2 is a block diagram showing a time-sharing synchronous wireless modem device of the mobile unit information sharing system of the first preferred embodiment of the invention.

In FIG. 2, the reference numbers 20, 21, 30 and 40 denote the same parts as in FIG. 1. The computing part 30 has a position information forwarding part 31 for forwarding position information of the own station and other stations to the position information display device 60, a communications state determining part 32 for determining a communications state, and a transmission timing control part 33 for determining a timing at which position information of the own station is transmitted, and the wireless modem part 40 has a voice communication control part 41 for outputting and inputting speech to and from the speaker 51 and the microphone 52 and a data modulating/demodulating part 42 for performing data modulation and demodulation.

Figure 3:
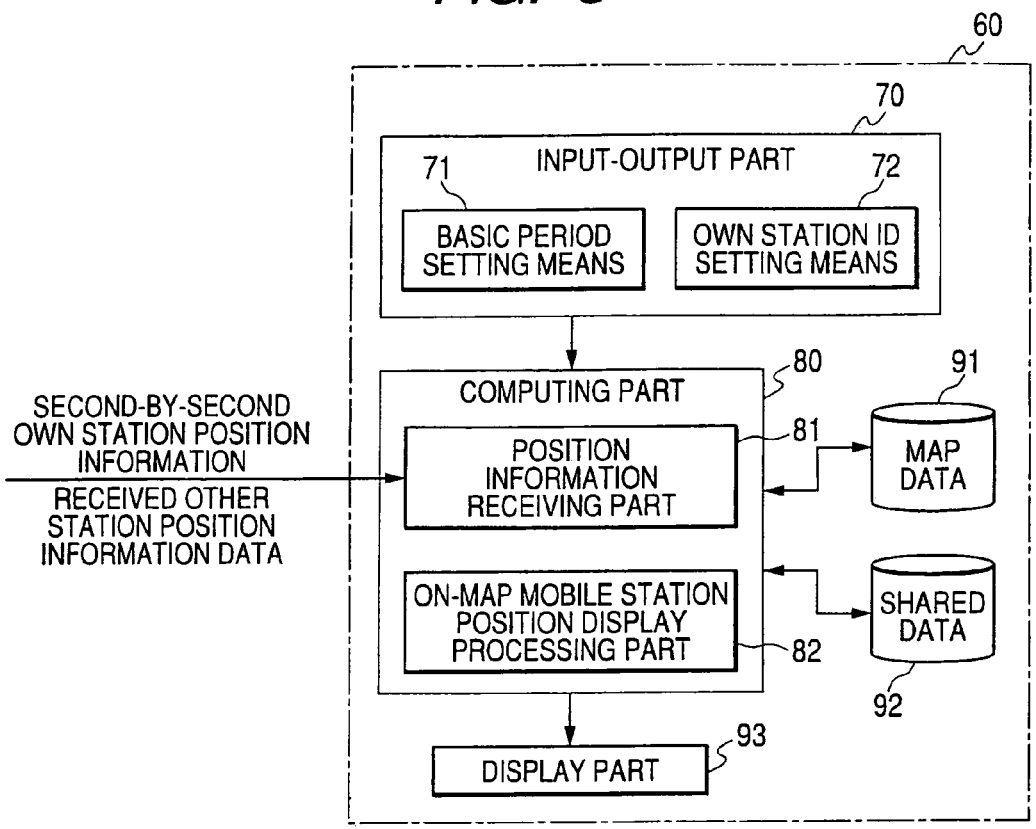
FIG. 3 is a block diagram showing a position information display device of a mobile unit information sharing system according to a first preferred embodiment of the invention.

FIG. 3 is a block diagram showing a position information display device of the mobile unit information sharing system of the first preferred embodiment of the invention.

In FIG. 3, the reference numbers 60, 70, 80 and 91 to 93 denote the same parts as in FIG. 1. The input-output part 70 has basic period setting-means 71 for setting a basic period for transmitting own station position information and own station ID setting means 72 for setting an own station ID, and the computing part 80 has a position information receiving part 81 for receiving own station and other station position-information and an on-map mobile station position display processing part 82 for displaying own station and other station positions on a map.

Figure 4:
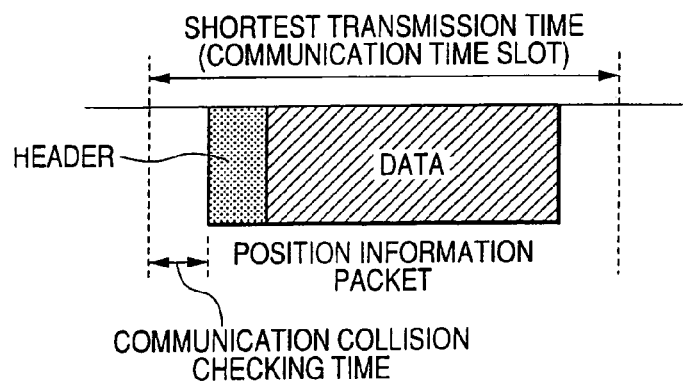
FIG. 4 is a view showing a position information packet of a mobile unit information sharing system according to a first preferred embodiment of the invention.

FIG. 4 is a view showing a position information packet of a mobile unit information sharing system according to the first preferred embodiment of the invention.

In FIG. 4, a position information packet made up of a header and data is transmitted within a communication time slot, which will be further discussed later, after a communication collision check time provided for checking for communication collisions with other stations. The header includes a transmitting station, a transmission period, a transmission timing, and a number of simultaneously active mobile stations. A condition of starting transmission is that no data has been received for 1 second before the start of transmission, and the communication collision checking time is provided to check this.

FIG. 5 is a view illustrating position information packet transmission timing of a mobile unit information sharing system according to the first preferred embodiment of the invention.

In FIG. 5, after a packet usage state checking time equivalent to the basic period, the transmission timing control part 33 transmits an own station position information packet 2 using an unused communication time slot 3 in the basic period (basic transmission period).

The shortest transmission time is set in adjustment of the mobile unit information sharing system before the system is operated, and when the mobile unit information sharing system is operating this shortest transmission time is fixed commonly in all of the mobile stations. The communication time slots 3 are formed with the length of this set shortest transmission time, and the basic period divided by the communication time slot 3 is the number of communication time slots in the basic period.

FIG. 6 is a view illustrating transmission timing after a collision of position information packets in the mobile unit information sharing system of the first preferred embodiment of the invention.

In FIG. 6, position information packets 2 of a station 2 and a station 3 have collided.

FIG. 7 is a flow chart showing position information transmission processing carried out by the computing part of the time-sharing synchronous wireless modem device of the mobile unit information sharing system of the first preferred embodiment of the invention.

Next, the operation of the system will be explained.

In the mobile station 1, position information and time information received by the GPS antenna 11 is acquired by the GPS receiver part 21 and sent to the computing part 30. In the transmission timing control part 33 of the computing part 30, with an accurately measured time such as the GPS time information as a reference, communication time slots for time-sharing communication are identified.

Specifically, when the basic period is 40 seconds and the shortest transmission time is 5 seconds, the first communication time slot is identified by the time at which the second units of the accurately measured time (common among all the stations, with no time difference) are 0 or a multiple of 5 as a reference, and after that the communication time slots are partitioned at time intervals of the shortest transmission time. In this way, synchronization of the communication time slots is achieved.

The transmission timing to carry out regular transmission of position information to the other stations is determined so as to use either one of these communication time slots, in the wireless modem part 40 the transmission data of the position information is converted into a form in which it can be transmitted by the wireless installation 53, and regular position information transmission is carried out by the wireless installation 53 via the communications antenna 54 using the communication time slots.

Next, a regular position information packet transmission timing determination procedure of the computing part 30 will be described, using FIG. 5.

As shown in FIG. 5, all the mobile stations conducting communications (station 1, station 2, station 3) achieve complete timing synchronization by means of an accurately measured time such as a GPS time, and identify communication timings (communication time slots) obtained by dividing a basic period (basic transmission period) by a shortest transmission time. When transmitting regular position information, first during 1 period (a packet usage state checking time) of the basic period the usage state of communication time slots is checked, and then at a communication timing at which it is determined that a time slot will be empty, as shown by the position information packet 2 of FIG. 5, transmission of the regular position information is started.

As shown in FIG. 5, when station 1 transmits a position information packet first (at this time, the number of simultaneously active mobile stations given in the header is 1), when station 2 then starts transmitting position information packets, the number of simultaneously active mobile stations given in the header becomes 2, and normal communication is confirmed.

When two or more mobile stations have carried out packet usage state checking at the same time and each has executed data transmission at the communication timing at which it determined that a time slot would be empty, a communication collision occurs, for example between station 2 and station 3 as shown in FIG. 6. In this case, because reception cannot be carried out normally at the receiving stations, the number of simultaneously active mobile stations using the frequency at the present time included in the communication data (header) of station 1 does not increase. From this it is detected that acquisition of communication timing has not been completed normally, and data transmission is carried out again with the communication timing randomly shifted among the empty time slots.

The position information display device 60 is connected by an Ethernet (registered trade mark) to the computing part 30, and the computing part 80 carries out map processing using the map data 91 and displays on the display part 93 not only the position of the own station but also the received position information of other mobile stations 1 on the map together with their paths traveled.

The base station 100 also operates in the same way as the mobile stations 1.

That is, with an accurately measured time such as time information received with the GPS antenna 111 as a reference, the computing part 130 identifies communication time slots for time-sharing communication, and time-sharing synchronous communication is carried out by the wireless installation 153 via the communication antenna 154. Position information of other stations received from other stations is stored in the shared data 192 of the position information display device 160 and displayed on the display part 193 together with the map data 191.

The mobile stations 1 and the base station 100 both conduct voice communication by converting voice information inputted and outputted to and from the microphones 52, 152 and the speakers 51, 151 with the wireless modem parts 40, 140.

Next, on the basis of FIG. 7, position information transmission processing carried out by the computing part 30 of the time-sharing synchronous wireless modem device 20 will be described.

Position information of the own station is received from the GPS receiver part 21 (step S1). This received own station position information is sent by the position information forwarding part 31 to the position information display device 60 every 1 second (step S2). Then, by the communications state determining part 32, it is determined whether or not regular position information communication to the other stations is in progress (step S3). If transmission to the other stations has been set to a stopped state, processing is ended. If the implementation of regular position information communication is being continued, processing proceeds to a step S7, which will be further discussed later.

When regular position information communication is to be newly started, the communications state determining part 32 checks the packet usage state and the number of simultaneously active mobile stations (step 4). The communications state determining part 32 then determines whether or not the time of the basic period set with the basic period setting means 171 has elapsed (step S5). If it has not elapsed, processing returns to step S4, and if it has elapsed, the transmission timing control part 33 sets the transmission timing to an empty time slot (step S6).

Then, in the transmission timing control part 33, it is determined whether or not the transmission timing has been reached (step S7), and if not then processing returns to step S1 and if so then the own station position information is transmitted to the wireless modem part 40 (step 8). Then, the transmission timing control part 33 determines whether or not the number of simultaneously active mobile stations has increased (step S9), and if it has increased then it is inferred that transmission has occurred normally and processing returns to step S1. If the number of simultaneously active mobile stations has not increased, it is inferred that transmission has not occurred normally, and the transmission timing control part 33 determines a transmission timing by randomly shifting to an empty time slot (step S10), after which processing returns to step S1.

The position information of the own station and other stations obtained as a result is stored in the shared data 92 and displayed on the display part 93 together with the map data 91.

In this first preferred embodiment, because the data transmission timing is decided by the computing part of the time-sharing synchronous wireless modem device of the respective mobile station, time-sharing synchronous communication can be carried out without the mediation of a communications control station such as a base station, and even when communication with a base station is cut off, without communication collisions between the mobile stations occurring, information can be shared among the multiple mobile stations by the communication of position information being carried out automatically and regularly.

And because by means of the position information display device not only the own station position but also position information (present position and movement history) of other stations having carried out transmission and reception can be confirmed on a map, when joint activities and cooperative activities are carried out, the state of the whole can be ascertained at each mobile station, and the efficiency of activities can be increased.

Second Preferred Embodiment

FIG. 8 is a view illustrating different position information transmission periods of a mobile unit information sharing system according to a second preferred embodiment of the invention.

FIG. 9 is a view illustrating position information transmission periods made variable in a mobile unit information sharing system according to the second preferred embodiment of the invention.

In FIG. 8 and FIG. 9, the reference numbers 2 and 3 denote the same things as in FIG. 5.

Whereas in the first preferred embodiment a case was discussed in which the regular position information transmission period was constant, in the second preferred embodiment, switching means for regular position information transmission period is provided in the computing part 30, and the regular position information transmission period can be varied in the middle of regular communications, as shown in FIG. 9.

As shown in FIG. 8, a shortened regular position information transmission period is set to a period of an integral submultiple of the basic period, so that overlapping of communication time slots between different periods does not occur. When three or more regular position information transmission periods are set, each is set to a period of an integral submultiple of the period one level longer. In FIG. 8, a transmission period A is set to a basic period, a transmission period B is set to ½ of the transmission period A, and a transmission period C is set to ¼ of the transmission period A. At this time, if the basic period is made 8 minutes, the communication time slot made 15 seconds, and the number of communication time slots thus made 32, the transmission period A will be 8 minutes, the transmission period B will be 4 minutes, and the transmission period C will be 2 minutes. Even the shortest transmission period is an integer multiple of the shortest transmission time.

FIG. 9 shows, when processing has been carried out to change the regular position information transmission period of station 1 from the transmission period A to the transmission period B, the regular position information transmission period having actually been changed to the transmission period B after a packet usage state checking time.

By making the regular position information transmission period variable like this it is possible to change the regular position information transmission period in correspondence with the speed of movement of the mobile station and the importance of its activity.

In this second preferred embodiment, because the regular position information transmission period has been made variable, it is possible to vary the amount of information transmitted (the frequency of transmission) in accordance with the speed of movement of the respective mobile station and the importance of its activity, the usage efficiency of the single wireless frequency increases, and information sharing between mobile stations can be carried out more efficiently.

Third Preferred Embodiment

Figure 10A:
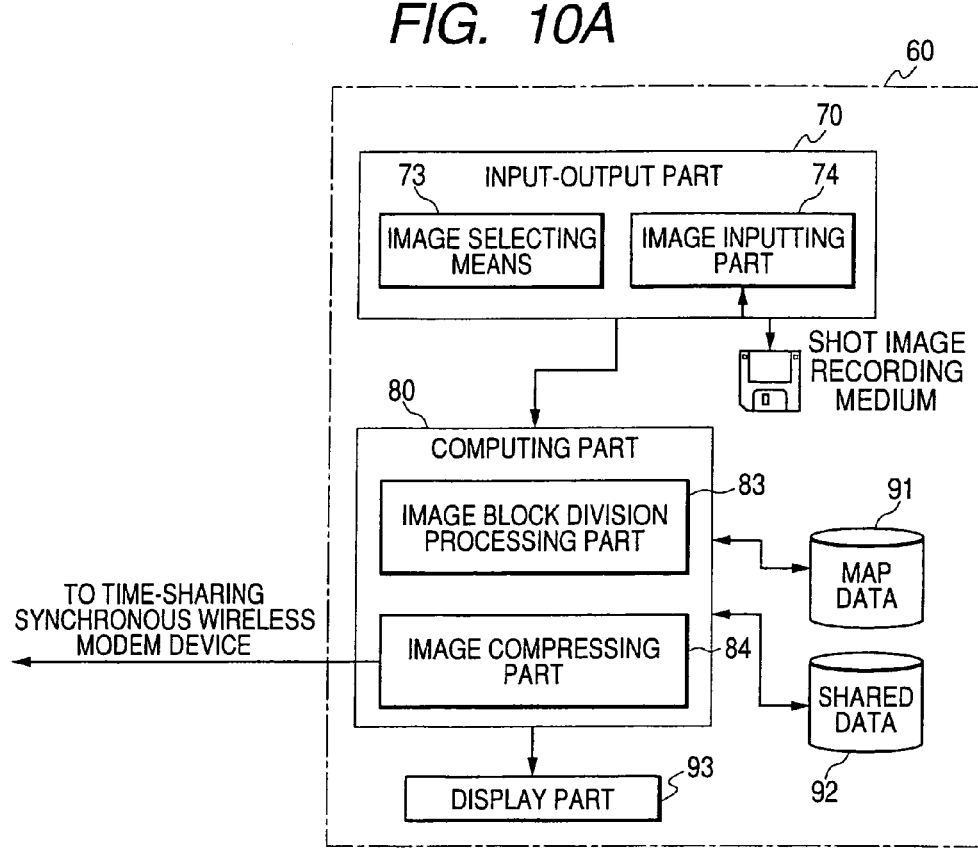
FIGS. 10A and 10B are views illustrating transmission of image data in a mobile unit information sharing system according to a third preferred embodiment of the invention.
Figure 10B:
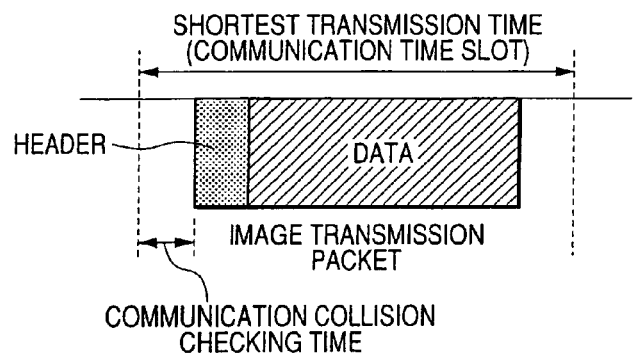

FIGS. 10A and 10B are views illustrating the transmission of image data in a mobile unit information sharing system according to a third preferred embodiment of the invention, FIG. 10A being a view showing the construction of a position information display device and FIG. 10B a view showing an image transmission packet for transmitting image information.

In FIG. 10A, the reference numbers 60, 70, 80 and 91 to 93 denote the same parts as in FIG. 3. The input-output part 70 is provided with image (for transmission) selecting means 73 for selecting an image for transmission and an image inputting part 74 for inputting an image from a shot image storage medium, and the computing part 80 is provided with an image block division processing part 83 for dividing images into blocks for transmission and an image compressing part 84 for compressing images. Although the input-output part 70 has the basic period setting means 71 and the own station ID setting means 72 of FIG. 3 and the computing part 80 has the position information receiving part 81 and the on-map mobile station position display processing part 82 of FIG. 3, in FIG. 10A these are omitted.

An image transmission packet is made up of a header and data, as shown in FIG. 10B.

FIG. 11 is a view illustrating the transmission timing of image data of a mobile unit information sharing system according to a third preferred embodiment of the invention.

In FIG. 11, the reference numbers 2 and 3 denote the same things as in FIG. 5. Image transmission packets 4 are also shown in FIG. 11.

This third preferred embodiment relates to transmitting high-volume data such as images. In this case, the image block division processing part 83 divides the transmission data into transmission block units (of a size transmittable within the shortest transmission time), and the image compressing part 84 compresses these as necessary to make image transmission packets 4 for transmission. Transmission is carried out using communication time slots unused in the regular position information communication, as shown in FIG. 11. At this time, in station 2 of FIG. 11, ordinary position information packets are given priority, and the image transmission packets 4 are transmitted in whatever empty time slots remain available.

In the third preferred embodiment, because the transmission of high-volume data such as images is carried out using communication time slots unused in the regular position information communication, the communication of high-volume data can be carried out using the single wireless frequency without regular position information communication being hindered, and high-volume data such as images can be shared among the multiple stations efficiently.

Fourth Preferred Embodiment

Figure 12A:
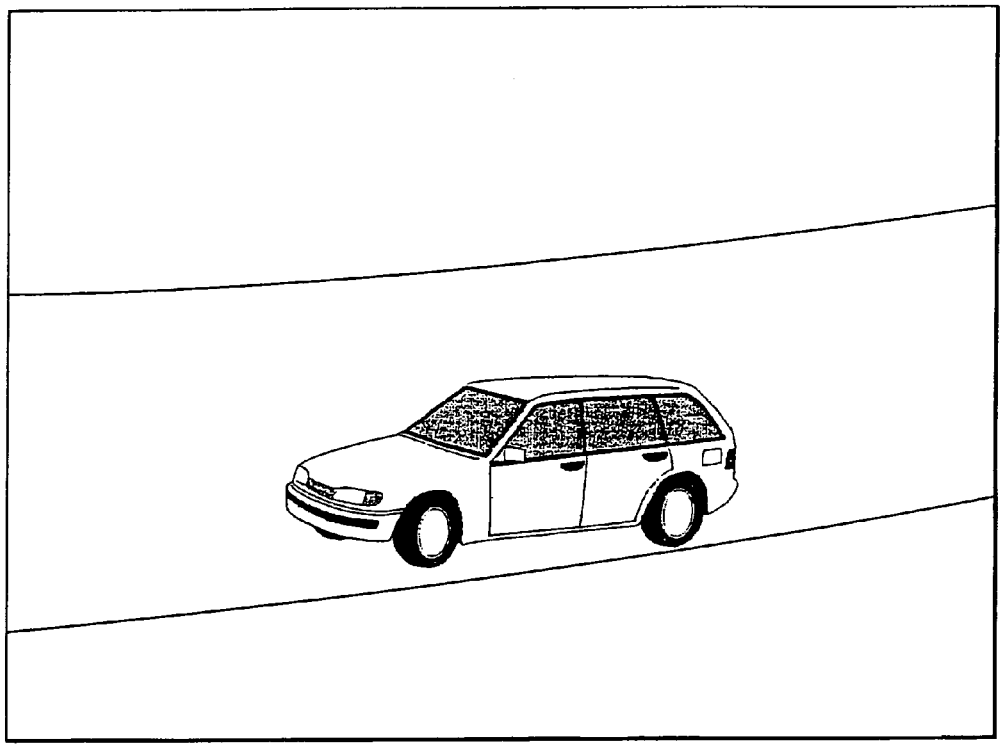
FIGS. 12A and 12B are views illustrating trimming of image data in a mobile unit information sharing system according to a fourth preferred embodiment of the invention.
Figure 12B:
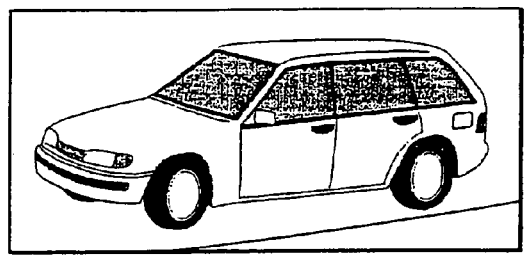

FIGS. 12A and 12B are views showing trimming of image data in a mobile unit information sharing system according to a fourth preferred embodiment of the invention. FIG. 12A shows an untrimmed image, and FIG. 12B a trimmed image.

In this fourth preferred embodiment, in the transmission of high-volume data such as an image, trimming of the image data is carried out to obtain only the necessary data, as shown in FIG. 12, before this image data is divided into block units (of a size transmittable within the shortest transmission time) and the blocks are compressed as necessary and transmitted. Transmission is carried out using communication time slots unused in the regular position information communication.

In the fourth preferred embodiment, because it is possible to transmit only the necessary part of the image data, the transmission time can be shortened and the number of communication time slots filled by the transmission of the image can be reduced.

Therefore, more information can be transmitted using the empty communication time slots available, and more information can be shared among the mobile stations.

Fifth Preferred Embodiment

Figure 13:
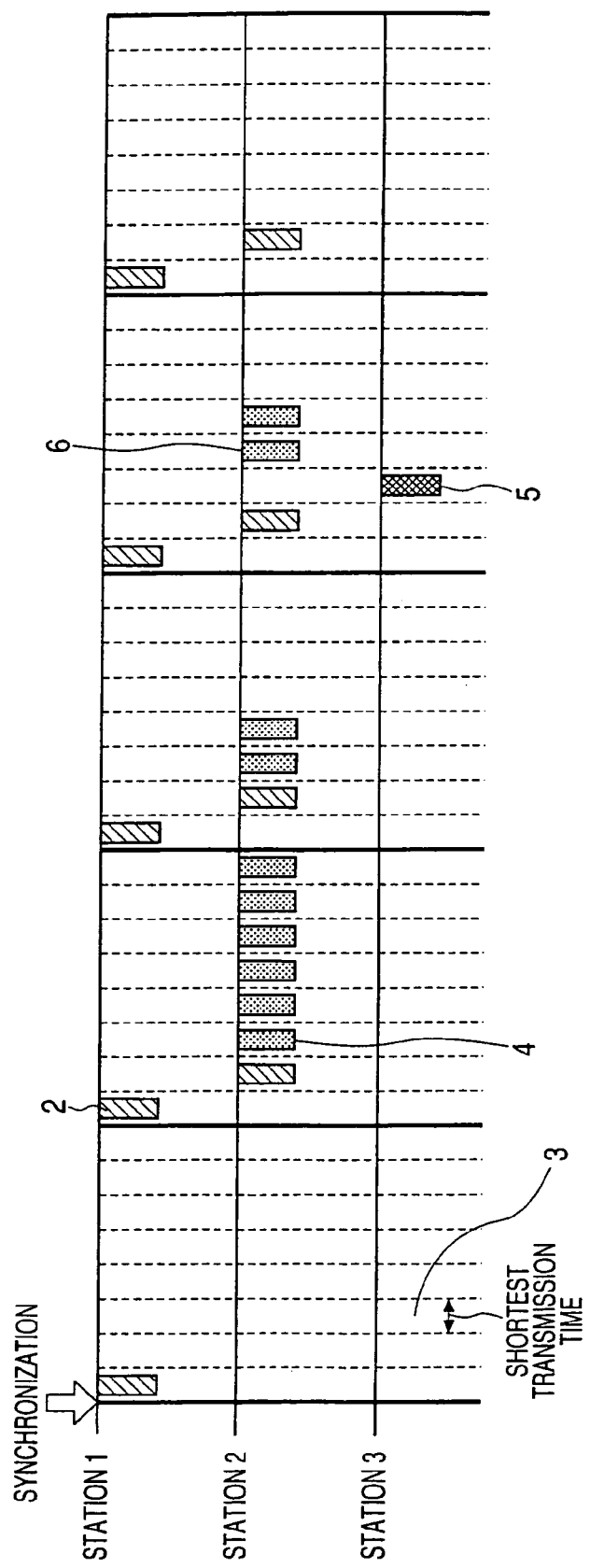
FIG. 13 is a view illustrating re-transmission of image data in a mobile unit information sharing system according to a fifth preferred embodiment c; the invention.

FIG. 13 is a view showing the re-transmission of image data in a mobile unit information sharing system according to a fifth preferred embodiment of the invention.

In FIG. 13, the reference numbers 2 to 4 denote the same things as in FIG. 11. An image re-transmission request 5 and re-transmitted data 6 re-transmitted in response to this are also shown.

This fifth preferred embodiment relates to cases in which a communication error has arisen in the divided-up communication of high-volume data such as images of the kind discussed in the third and fourth preferred embodiments; the receiving station (in the case of FIG. 13, station 3) performs error-detection on the block units, and, only with respect to image data in which an error has arisen, makes an image re-transmission request 5. The timing of the transmission from the receiving station of image re-transmission requests 5 relating to blocks of image data in which errors have occurred is also carried out using unused communication time slots.

The re-transmission from the transmitting side (in FIG. 13, station 2) of re-transmitted data 6 of the blocks of image data in which errors have occurred is also carried out, after the image re-transmission request 5 is received, utilizing communication time slots unused in the regular position information communication.

In this fifth preferred embodiment, when a communication error has occurred in the divided-up communication of high-volume data, because unused communication time slots are utilized to carry out re-transmission of only the error-containing blocks, the communication of high-volume data can be completed normally in a shorter time of a length such that regular position information communication is not hindered, and the number of communication time slots filled by such transmissions can be reduced.

Therefore, more information can be transmitted using the empty communication time slots available, and more information can be shared among the mobile stations.

Sixth Preferred Embodiment

Figure 14:
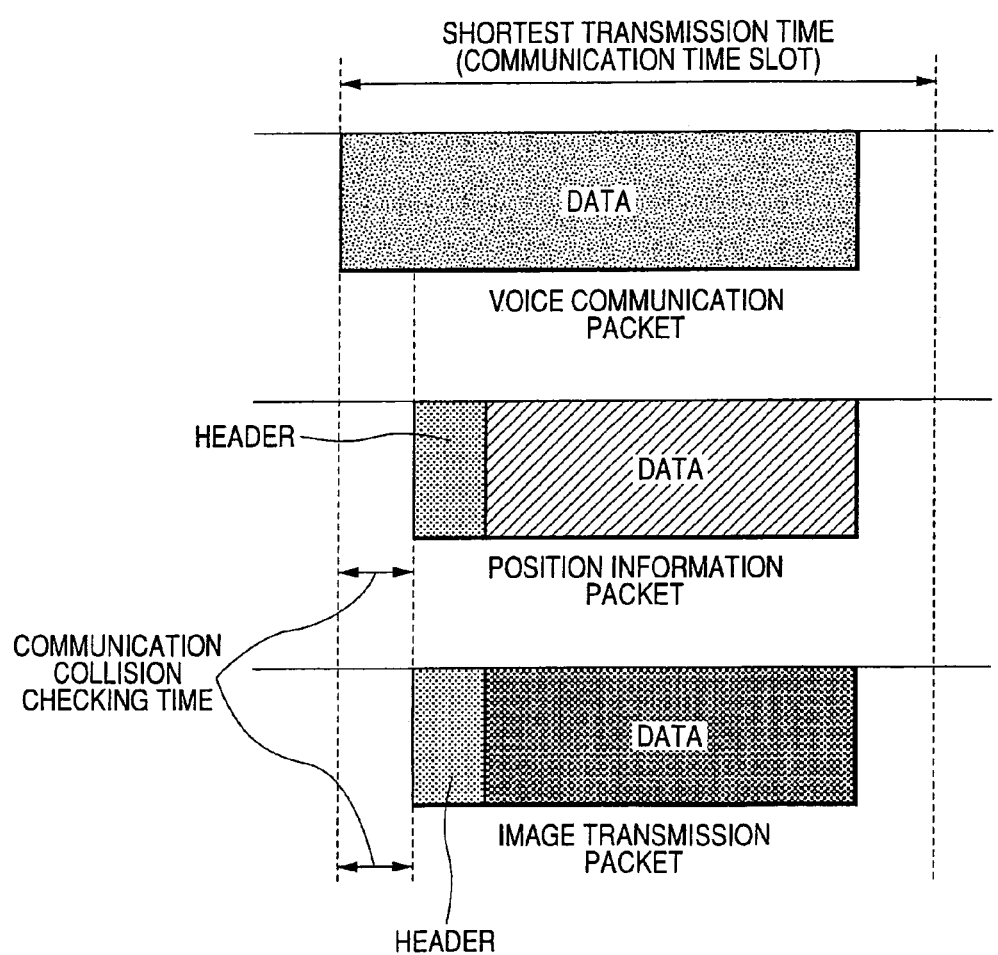
FIG. 14 is a view showing a difference between a voice communication packet and other packets in a mobile unit information sharing system according to a sixth preferred embodiment of the invention.

FIG. 14 is a view illustrating a difference between a voice communication packet and other packets in a mobile unit information sharing system according to a sixth preferred embodiment of the invention.

In FIG. 14, because the voice communication packet is transmitted with priority over other packets, a communication collision checking time is not provided.

Figure 15:
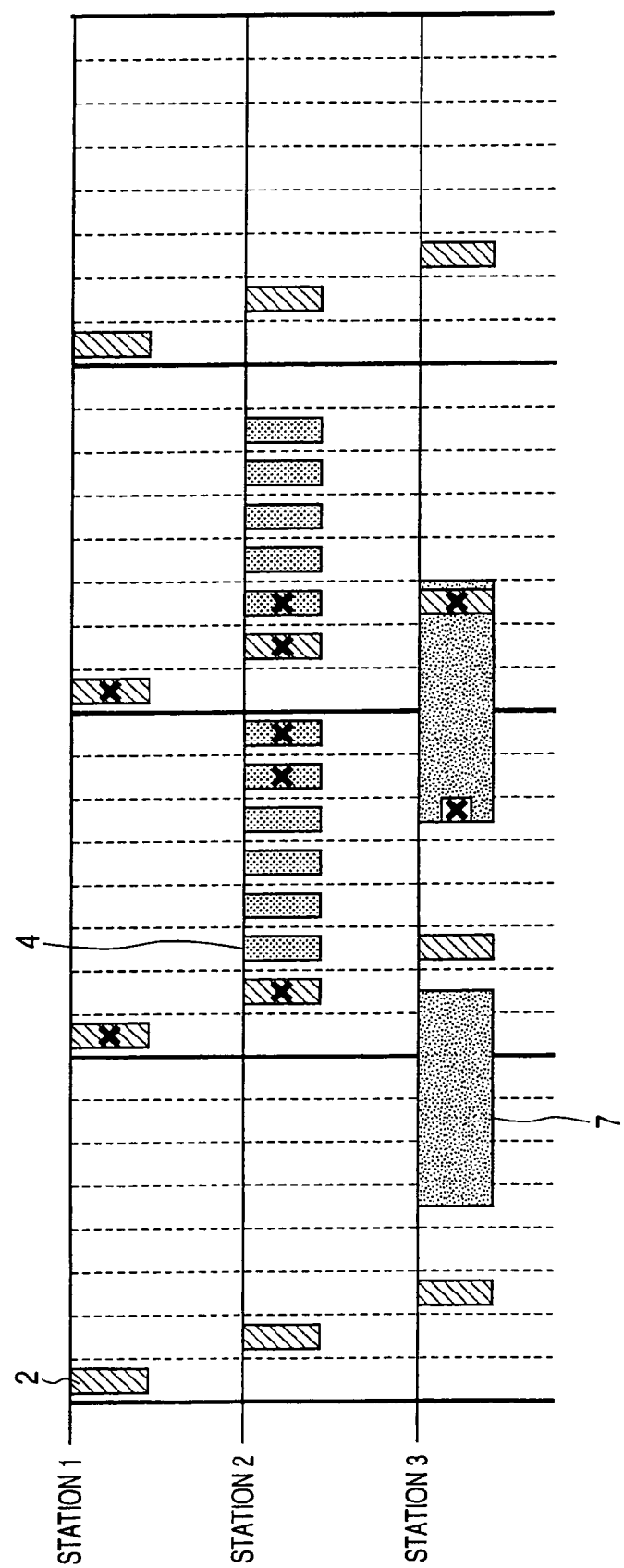
FIG. 15 is a view illustrating priority transmission of a voice communication packet in a mobile unit information sharing system according to a sixth preferred embodiment of the invention.

FIG. 15 is a view showing priority transmission of voice communication packets in a mobile unit information sharing system according to the sixth preferred embodiment of the invention.

In FIG. 15, the reference numbers 2 and 4 denote the same things as in FIG. 11. A voice communication packet 7 has been transmitted from station 3. In the figure, the mark X indicates a packet that was not transmitted.

Figure 16:
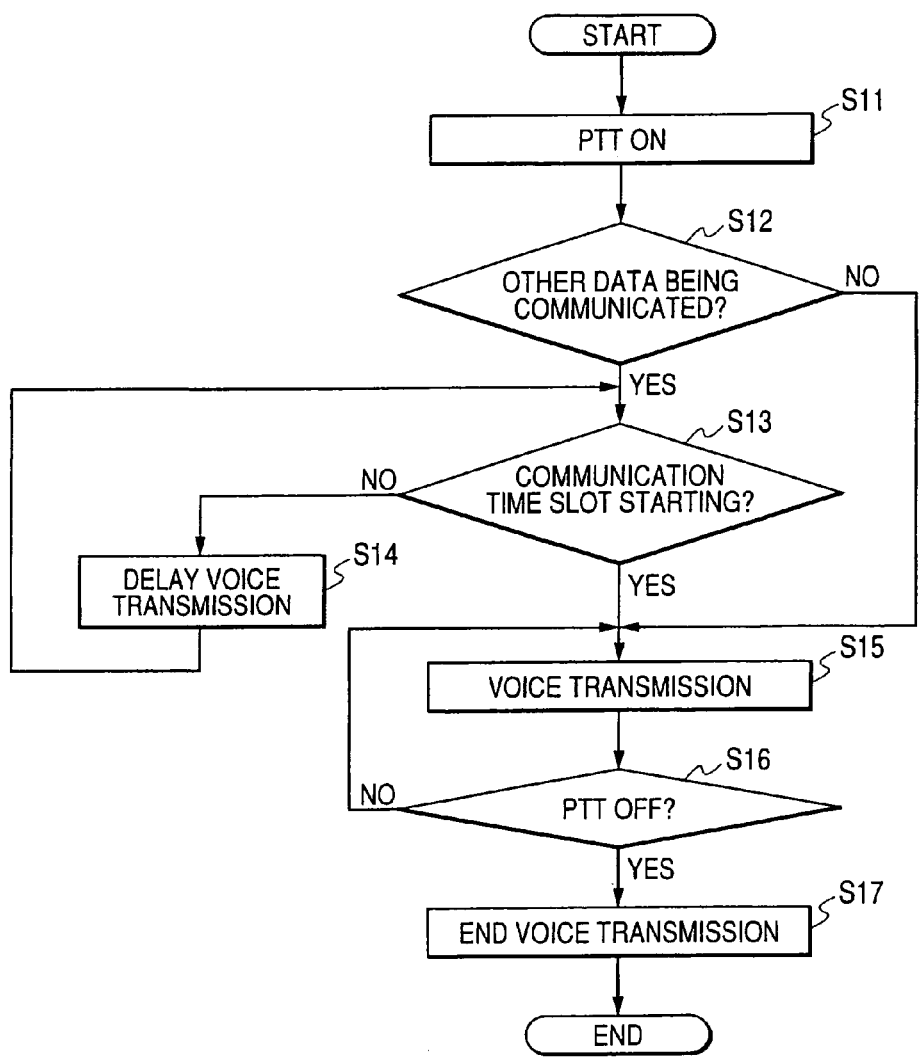
FIG. 16 is a flow chart showing transmission processing of a voice communication packet of a mobile unit information sharing system according to a sixth preferred embodiment of the invention.

FIG. 16 is a flow chart showing voice communication packet transmission processing in a mobile unit information sharing system according to the sixth preferred embodiment of the invention.

Figure 17:
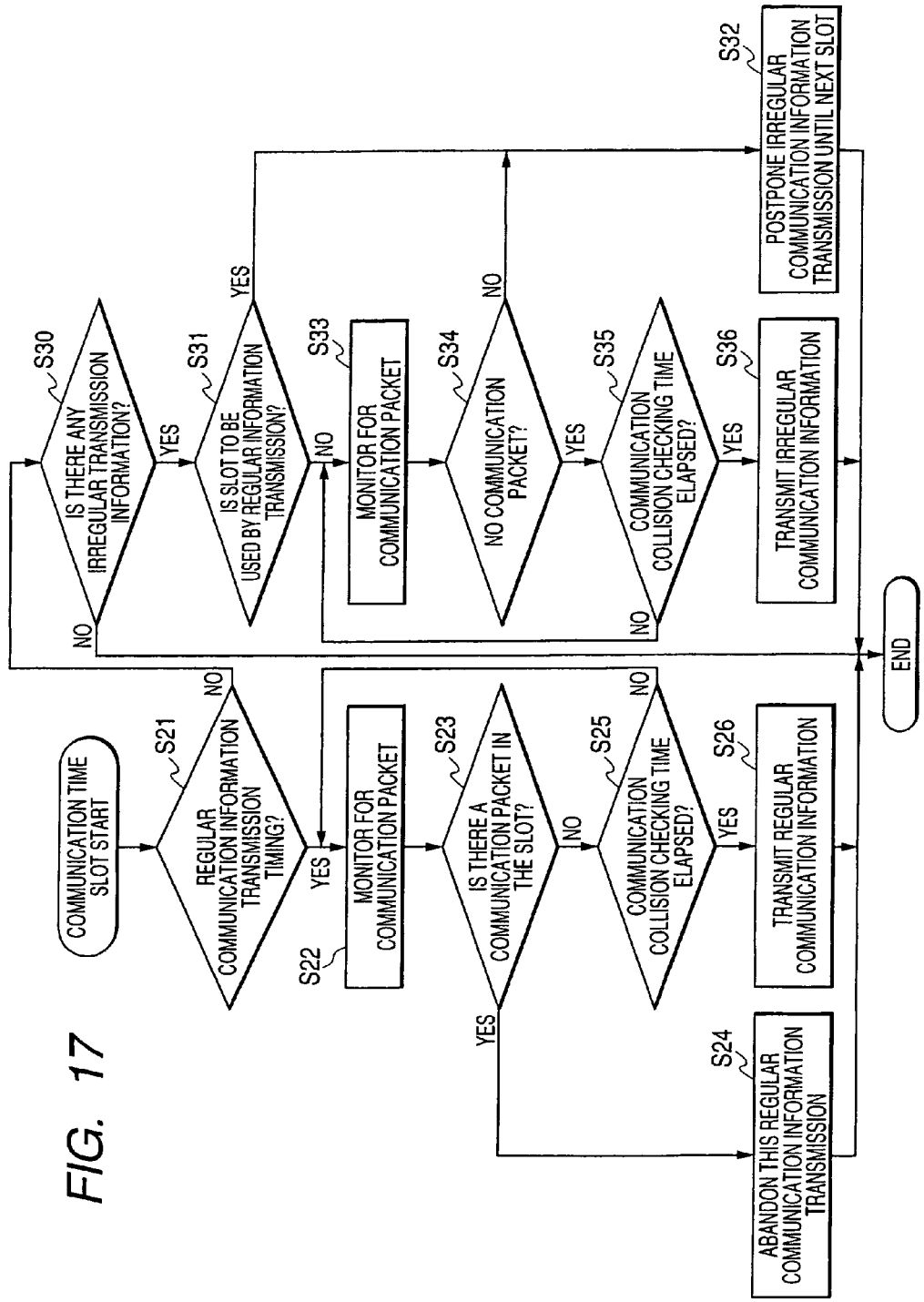
FIG. 17 is a flow chart showing transmission processing of regular communications information and irregular communications information in a mobile unit information sharing system according to a sixth preferred embodiment of the invention.

FIG. 17 is a flow chart showing transmission processing of regular communication information and irregular communication information in a mobile unit information sharing system according to the sixth preferred embodiment of the invention.

In this sixth preferred embodiment, voice communication packets are transmitted with priority over other packets.

In the computing part 30, when transmitting position information packets of regular position information or image transmission packets of divided-up data of an image or the like, before these packets are transmitted, in a communication collision checking time provided in these packets, it is checked that communication is not being carried out in the communication time slot to be used for transmission.

As shown in FIG. 15, when in the communication collision checking time it is found that the communication time slot to be used for transmission is already being used for a voice communication packet, in the case of a regular position information transmission (position information packet) the transmission is abandoned, and in the case of a divided-up transmission (image transmission packet) of high-volume data such as an image the transmission is postponed to an empty time slot after the transmission of voice communication packets ends.

No communication collision checking time is provided in the voice communication packet, as shown in FIG. 14, and transmission of a voice communication can be started at any time. Voice communication can be started as soon as the PTT switch is pressed (a signal for starting voice transmission) When the start timing of a voice communication does not fall inside the communication collision checking time of another information packet, but rather coincides with data communication (transmitting and receiving), the start of the voice communication is delayed until the next communication time slot.

In FIG. 15, for each of the position information packets it is checked in the communication collision checking time whether voice communication packet transmission is in progress, and if a voice communication packet is being transmitted the transmission of the position information packet is abandoned to avoid a collision. In the case of an image transmission packet also it is checked in the communication collision checking time whether voice communication packet transmission is in progress, and if a voice communication packet is being transmitted, the transmission of the image data packet is postponed.

Next, on the basis of FIG. 16, voice communication packet transmission processing carried out by the computing part 30 will be explained.

When the voice communication control part 41 detects that the PTT switch is ON (step S11), the communications state determining part 32 determines whether or not data communication is in progress (step S12). If communication is not in progress processing proceeds to step S15, and if communication is in progress the transmission timing control part 33 determines whether or not a communication time slot is starting (step S13), and if a communication time slot is not starting, voice transmission is delayed until the start of the next communication time slot (step S14). If in step S13 a communication time slot is starting, voice transmission to the wireless modem part 40 is carried out (step S15). Step S15 is executed until it is detected by the voice communication control part 41 that the PTT switch is OFF (step S16), and when it is detected that the PTT switch is OFF, voice transmission is ended (step S17).

Next, on the basis of FIG. 17, transmission processing carried out by the computing part 30 of regular communication information such as position information packets, of which communication is to be carried out regularly, and of irregular communication information such as image transmission packets, which it is not necessary to communicate regularly, will be explained.

Before the start of a communication time slot, the communications state determining part 32 checks for the packet usage state of each communication time slot in the previous basic period (the packet usage state checking period).

At the start of each communication time slot, the transmission timing control part 33 of the computing part 30 determines whether or not that communication time slot is the timing of a regular communication information transmission of the own station (step S21), and if it is the timing of a regular communication information transmission the communications state determining part 32 monitors the communication packet for the duration of the communication collision checking time (step S22) and determines whether or not there is a communication packet (step S23); if there is no communication packet for the duration of the, communication collision checking time (step S25) it infers that there is no voice communication, and the transmission timing control part 33 infers that regular communication information can be transmitted and executes transmission via the wireless installation 53 (step S26). If in step S25 the communication collision checking time has not elapsed, processing returns to step S22. If in step S23 there is the transmission of a communication packet, it is determined that voice communication is being carried out, and the transmission of that regular communication information is abandoned (step S24).

If at the start of a communication time slot in step S21 the communication time slot is not the timing of a regular communication information transmission (i.e. not a transmission timing of the own station), it is determined whether there is irregular communication information to be transmitted (step S30), and if there is irregular communication information to be transmitted, the communications state determining part 32 determines whether or not the communication time slot is being used for the communication of regular communication information (i.e. another station is transmitting regular communication information) (step S31), and if it is being used for the communication of regular communication information the transmission of the irregular communication information is postponed until the next communication time slot (step S32).

If in step S31 the communication time slot is not being used for the communication of regular communication information, the communications state determining part 32 monitors the communication packet for the duration of the communication collision checking time (step S33) and determines whether or not there is a communication packet (step S34); if there is no communication packet for the duration of the communication collision checking time (step S35) it infers that there is no voice communication, and the transmission timing control part 33 infers that irregular communication information can be transmitted and executes transmission via the wireless installation 53 (step S36). If in step S35 the communication collision checking time has not elapsed, processing returns to step S33. If in step S34 there is the transmission of a communication packet, it is determined that voice communication is being carried out, and the transmission of the irregular communication information is postponed until the next communication time slot (step S32).

In this sixth preferred embodiment, while sharing of information such as regular position information and image data information is carried out using a single wireless frequency, voice communications, which generally are often urgent, can be given priority at all times, and consequently it is possible to realize a practical system as a mobile unit information sharing system utilizing voice communications wireless.

Seventh Preferred Embodiment

Figure 18:
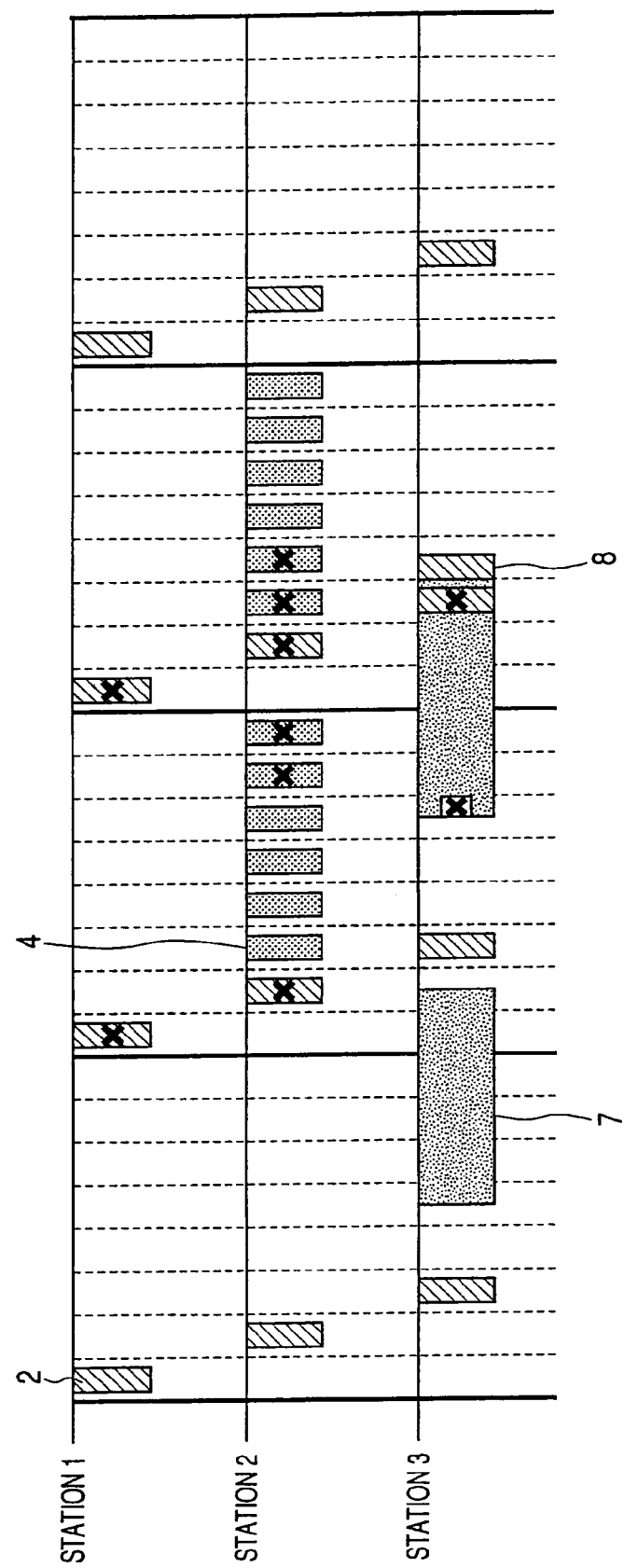
FIG. 18 is a view illustrating transmission of a voice communication packet in a mobile unit information sharing system according to a seventh preferred embodiment of the invention.

FIG. 18 is a view illustrating transmission of voice, communication packets in a mobile unit information sharing system according to a seventh preferred embodiment of the invention.

In FIG. 18, the reference numerals 2, 4 and 7 denote the same things as in FIG. 15. In FIG. 18, a position information packet 8 from station 3 is disposed at the tail end of a voice communication packet 7.

Whereas in the sixth preferred embodiment, when a regular communication information communication and a voice communication overlapped, the voice communication was given priority and the communication of that regular communication information was abandoned, in this seventh preferred embodiment, in that situation, instead of abandoning the communication of the regular communication information, a new regular position information packet 8 is added to the tail end of the voice communication and transmitted.

With this seventh preferred embodiment, by adding any regular position information packet held up by a priority voice communication to the tail end of the voice communication packet, it is possible to update the regular position information that was held up.

And, even when voice communication continues for a long time, because regular position information transmission is carried out automatically whenever the voice communication stops for as long as the shortest transmission time (about 5 seconds), the regular position information can be updated without the regular communication period being awaited.

Eighth Preferred Embodiment

Figure 19A:
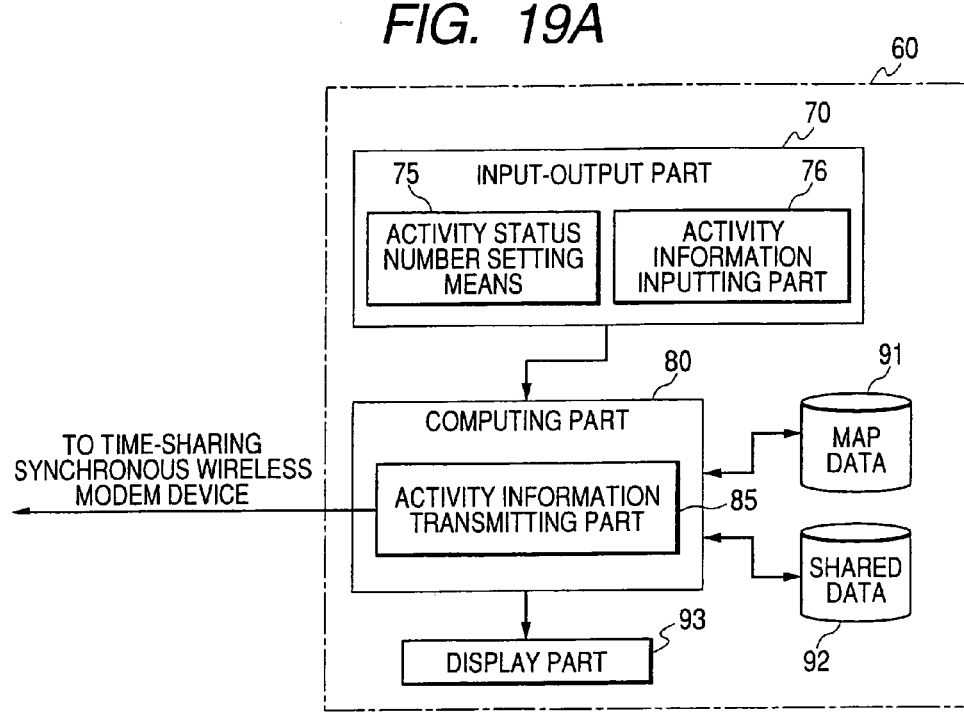
FIGS. 19A and 19B are views illustrating activity status information transmission in a mobile unit information sharing system according to an eighth preferred embodiment of the invention.
Figure 19B:
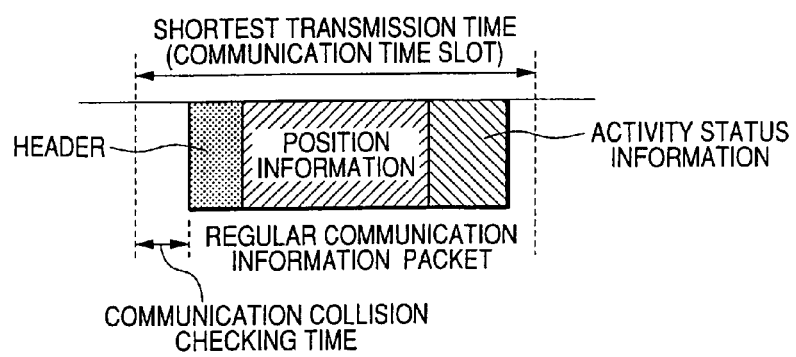

FIGS. 19A and 19B are views illustrating activity status information transmission in a mobile unit information sharing system according to an eighth preferred embodiment of the invention, FIG. 19A being a view showing a position information display device and FIG. 19B a view showing a regular communication information packet.

In FIG. 19, the reference numbers 60, 70, 80 and 91 to 93 denote the same things as in FIG. 3. The input-output part 70 is provided with activity status number setting means 75 for setting a status number showing the activity status of the own station and an activity information inputting part 76 for inputting information showing an activity status, and the computing part 80 is provided with an activity information transmitting part 85 for transmitting activity information inputted with the activity information inputting part 76. The input-output part 70 also has the basic period setting means 71 and the own station ID setting means 72 shown in FIG. 3, and the computing part 80 also has the position information receiving part 81 and the on-map mobile station position display processing part 82 shown in FIG. 3, but in FIG. 19 these are omitted.

In this eighth preferred embodiment, in advance, a status number common to all the mobile stations is set for each of a number of activity items, and at each mobile station, when its activity status changes, current activity status information (Setting off, Arrived At Site, Surveying, Completed Survey, Starting Work, Finished Work, Leaving Site, Returning To Base, etc.) is inputted using the activity information inputting part 76 of the position information display device 60. At the time of a regular position information transmission, this status number is added to the tail end of the position information and transmitted in the regular communication packet, as shown in FIG. 19B.

At the mobile stations receiving this activity status, on the basis of the received activity status number, the activity status of the respective mobile station is displayed on the screen of the position information display device 60. As the content displayed at this time, for example after a status number indicating that the respective mobile station is starting work is received, 'Working' is displayed, and after a status number indicating that the mobile station has finished work is received, this is changed to 'Finished Work'.

With this eighth preferred embodiment, instead of having to report by means of a voice connection every time an activity report is to be made, activity reporting to multiple mobile stations can be carried out automatically by setting an activity status using the GUI of the position information display device 60 on the mobile station side, and an activity display at each station receiving the report is also updated automatically. As a result, the activity states of mobile stations can be understood easily.

Ninth Preferred Embodiment

FIG. 20 is a view showing an activity history table of a mobile unit information sharing system according to a ninth preferred embodiment of the invention.

In this ninth preferred embodiment, when an activity status information type (activity status number) obtained as described in the eighth preferred embodiment is different from the previous activity status of the same mobile station, the current time and the position of the mobile station are recorded in the computing part 80 of the position information display device 60, and this information on the mobile stations is listed in chronological order to make an activity history table of the kind shown in FIG. 20.

With this ninth preferred embodiment, because an activity history of the mobile stations is created automatically by the computing part of the position information display device 60, it is possible to refer to an activity history at any time simply by reading it out from the position information display device 60, and activity management of the mobile stations can be realized easily.

Tenth Preferred Embodiment

Figure 21:
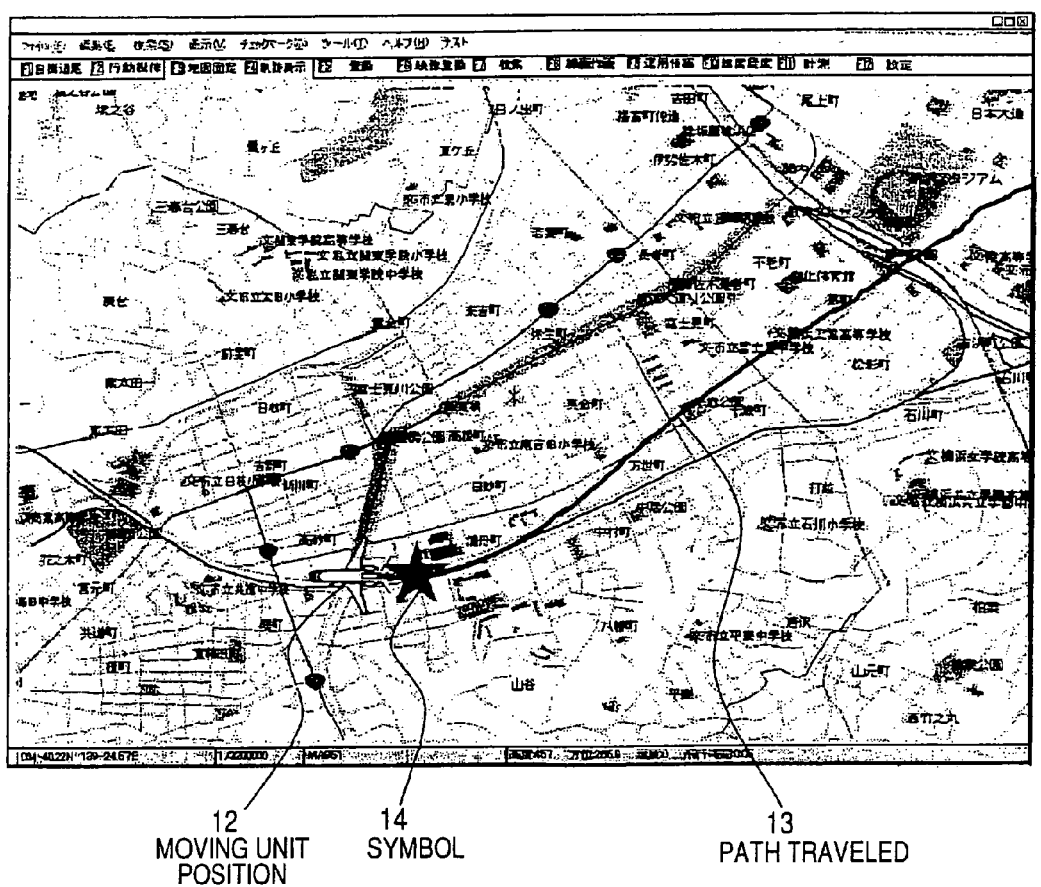
FIG. 21 is a view showing a display of an object on a map in a mobile unit information sharing system according to a tenth preferred embodiment of the invention.

FIG. 21 is a view showing a display of objects on a map in a mobile unit information sharing system according to a tenth preferred embodiment of the invention.

In FIG. 21, a mobile unit position 12 of a mobile station, a path traveled 13 of the mobile station, and a symbol 14 of an object are shown on a map.

When a mobile station comes across the site of an accident or the position of a search vehicle or a person in trouble, the position and an attribute of this object are recorded as symbol 14 information using the GUI of the position information display device 60. If a symbol status number is set and shared for each attribute, and a symbol icon corresponding to each is stored in the position information display device 60 of each mobile station, at the time of transmission of regular communication information packets this can be added, and when reception of the symbol information completes on the receiving side the symbol 14 icon of the corresponding attribute can be displayed in the corresponding position on the map screen of the display part 93 of the position information display device 60.

In an emergency, if symbol information is transmitted as high-volume data using empty communication time slots (by it being written that it is symbol information, together with a symbol ID, in the header of a symbol information packet) then the data can be transmitted without waiting for the transmission period of a regular position information packet.

With this tenth preferred embodiment, object information acquired by one mobile station can be shared among multiple stations as symbol information (position+attribute information), this can be effectively utilized as onsite information for understanding the onsite situations at a base station, and also can be effectively utilized as onsite information for referring at the other stations approaching from far to give support, then the respective business efficiencies are raised.

Eleventh Preferred Embodiment

Figure 22:
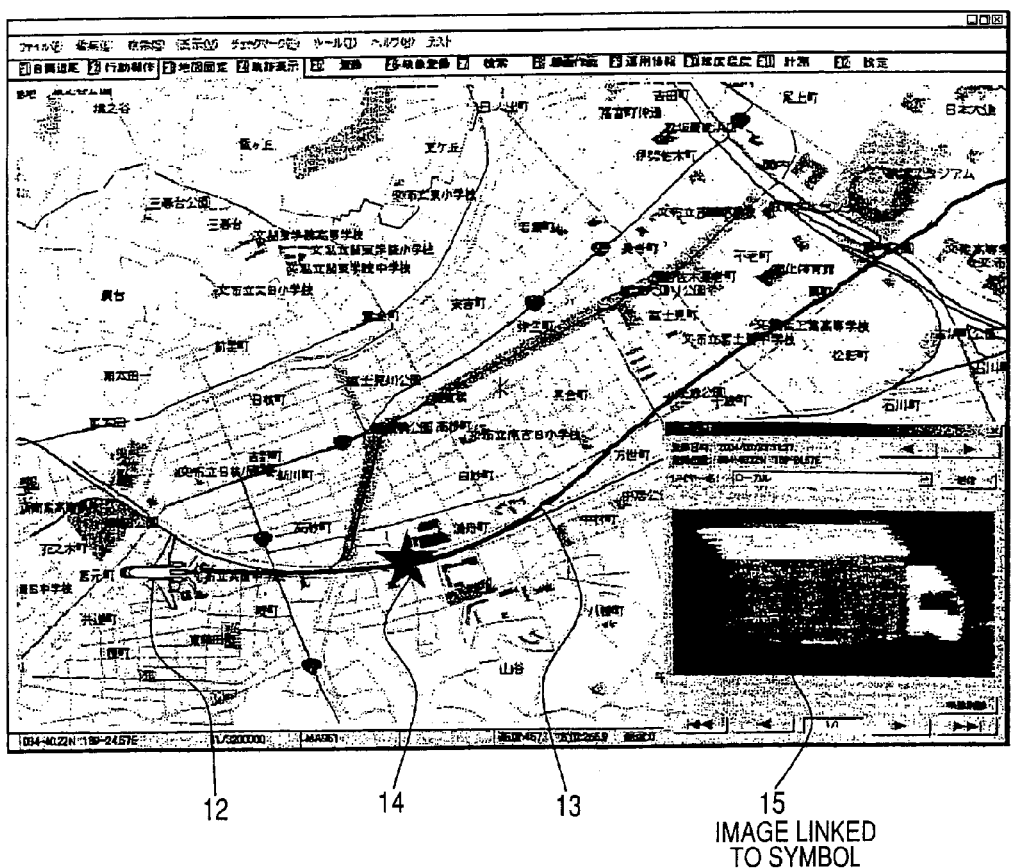
FIG. 22 is a view showing a display of information relating to an object on a map in a mobile unit information sharing system according to an eleventh preferred embodiment of the invention.

FIG. 22 is a view showing a display of information related to an object on a map in a mobile unit information sharing system according to an eleventh preferred embodiment of the invention.

In FIG. 22, the reference numbers 12 to 14 denote the same things as in FIG. 21. In FIG. 22, an image 15 linked to a symbol is displayed.

In this eleventh preferred embodiment, image data (a photographed image) corresponding to symbol information registered as described in the tenth preferred embodiment is inputted to the position information display device 60 by inserting a removable medium (removable recording medium) taken out of a camera and transmitted together with the ID of the corresponding symbol information.

At the stations receiving this, when reception completes, by this image being registered in association with the corresponding symbol 14, an image 15 linked to the symbol can be viewed on the map screen of the position information display device 60.

With this eleventh preferred embodiment, by an image being linked to symbol information and transmitted and shared along with the symbol information, it is made possible for multiple mobile stations to view not only position and attribute information about objects such as accident sites and ships in trouble but also to see them visually, and situations can be understood more certainly.

Twelfth Preferred Embodiment

Figure 23:
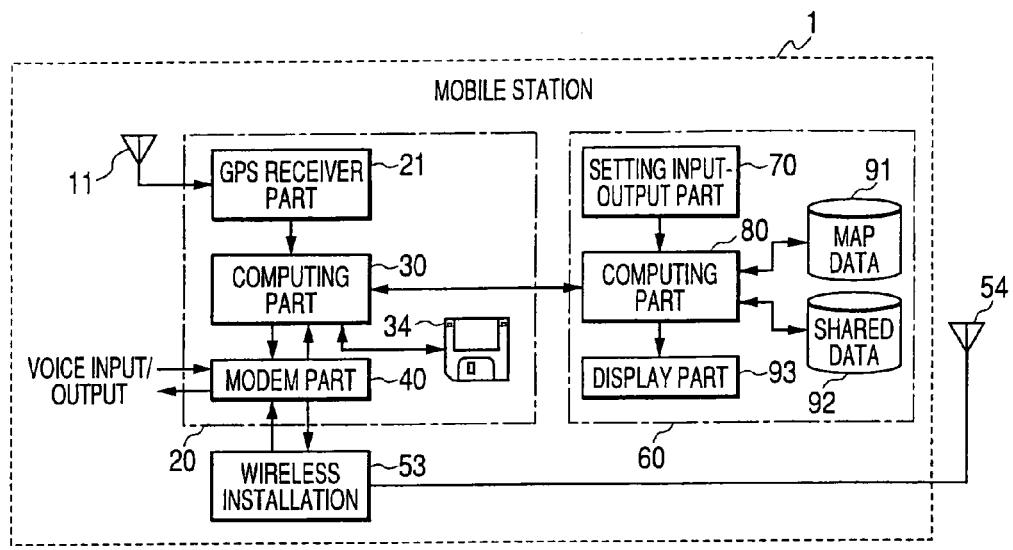
FIG. 23 is a block diagram showing a mobile station of a mobile unit information sharing system according to a twelfth preferred embodiment of the invention.

FIG. 23 is a block diagram showing a mobile station of a mobile unit information sharing system according to a twelfth preferred embodiment of the invention.

In FIG. 23, the reference numbers 1, 11, 20, 21, 30, 40, 53, 54, 60, 70, 80 and 91 to 93 denote the same parts as in FIG. 1. A removable medium slot is provided in the computing part 30, and information can be inputted and outputted to and from a removable medium (removable storage medium) 34 by the removable medium 34 being inserted and removed.

In this twelfth preferred embodiment, a removable medium slot is provided in the computing part 30, and position/activity history/symbol information is automatically recorded on the removable medium. In this case, not only detailed information pertaining to the own station but also information received from other stations is stored on the removable medium.

Thus, in this case, shared data can be held in both the shared data 92 of the position information display device 60 and a removable medium inserted into the time-sharing synchronous wireless modem device 20.

With this twelfth preferred embodiment, by inserting a removable medium into the removable medium slot connected to the computing part 30 of any mobile station, it is possible to reproduce detailed information such as second-by-second movement histories; detailed data held by one mobile station can easily be developed; and business management following the completion of activities can be facilitated.

Thirteenth Preferred Embodiment

Figure 24:
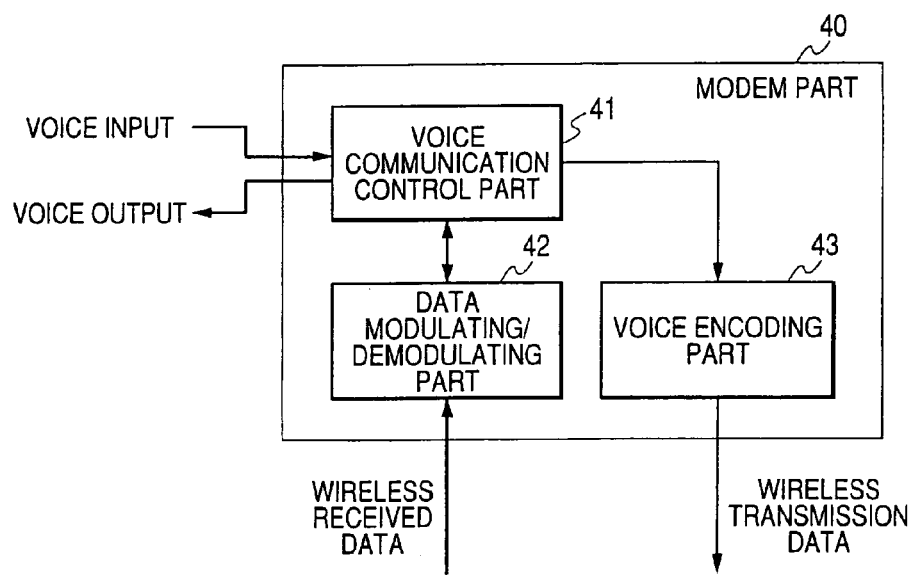
FIG. 24 is a block diagram showing a wireless modem part of a mobile unit information sharing system according to a thirteenth preferred embodiment of the invention.

FIG. 24 is a block diagram showing a wireless modem part of a mobile unit information sharing system according to a thirteenth preferred embodiment of the invention.

In FIG. 24, the reference numbers 40 to 42 denote the same parts as in FIG. 2. The wireless modem part 40 is provided with a voice encoding part 43.

In this thirteenth preferred embodiment, when carrying out digital voice communications, voice encoding is carried out by the voice encoding part 43 of the wireless modem part 40, and secure voice communications are realized. As the voice encoding method, a method such as AMBE (Advanced Multi-Band Excitation) is used, with which communication is carried out at as low a speed as possible and the frequency bandwidth taken up by it is kept to a minimum.

With this thirteenth preferred embodiment, when operating a mobile unit information sharing system in an organization in which the leakage of communication content is undesirable, such as a government or municipal department, the content of communications can be protected from the danger of information leakage and it is possible to carry out voice communications safely.

Fourteenth Preferred Embodiment

Figure 25:
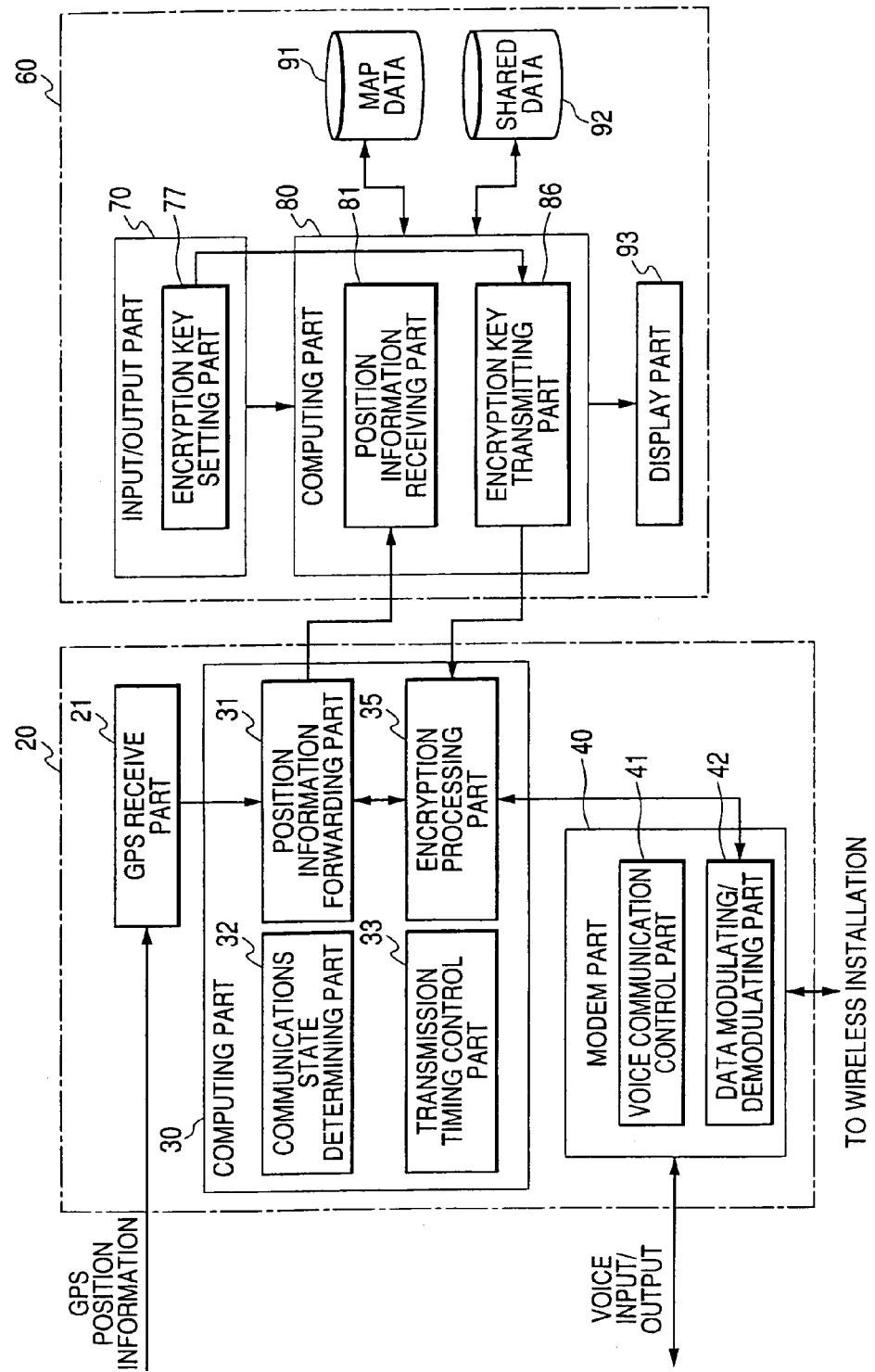
FIG. 25 is a block diagram showing a time-sharing synchronous wireless modem device and a position information display device of a mobile station of a mobile unit information sharing system according to a fourteenth preferred embodiment of the invention.

FIG. 25 is a block diagram showing a time-sharing synchronous wireless modem device and a position information display device of a mobile station of a mobile unit information sharing system according to a fourteenth preferred embodiment of the invention.

In FIG. 25, the reference numbers 20, 21, 30 to 33 and 40 to 42 denote the same parts as in FIG. 2, and the reference numbers 60, 70, 80, 81 and 91 to 93 denote the same parts as in FIG. 3. The computing part 30 is provided with an encryption processing part 35, the input-output part 70 is provided with an encryption key setting part 77, and the computing part 80 is provided with an encryption key transmitting part 86.

Digital modulation and demodulation of digital data such as position information, images, and symbol information is carried out by for example OFDM (Orthogonal Frequency Division Multiplexing), which realizes wide-band transmission efficiently utilizing a narrow frequency range and raises the efficiency of frequency utilization, and for digital voice, encoding for wireless transmission is carried out using AMBE or the like, and in this fourteenth preferred embodiment, the computing part 30 is further provided with an encryption processing part 35, and encrypting of communications information is carried out. The encrypting method employed is made a method which uses a public algorithm and the safety of which has been fully confirmed by research carried out in the past, and the encryption key is made changeable by means of the encryption key setting part 77.

With this fourteenth preferred embodiment, when operating a mobile unit information sharing system in an organization in which the leakage of voice communication content is undesirable, such as a government or municipal department, the content of communications can be protected from the danger of information leakage and it is possible to share information safely within related organizations only.

Fifteenth Preferred Embodiment

Figure 26A:
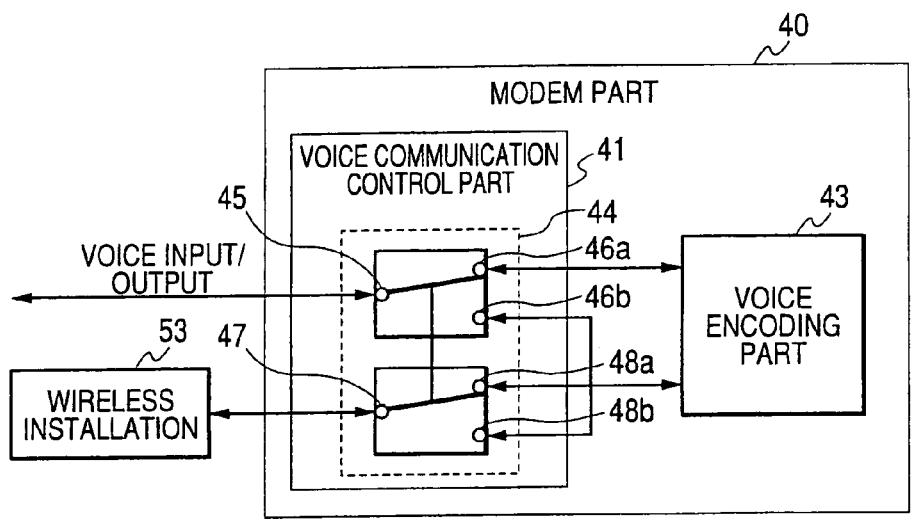
FIGS. 26A and 26B are block diagrams showing wireless modem parts of mobile unit information sharing systems according to fifteenth and sixteenth preferred embodiments of the invention.
Figure 26B:
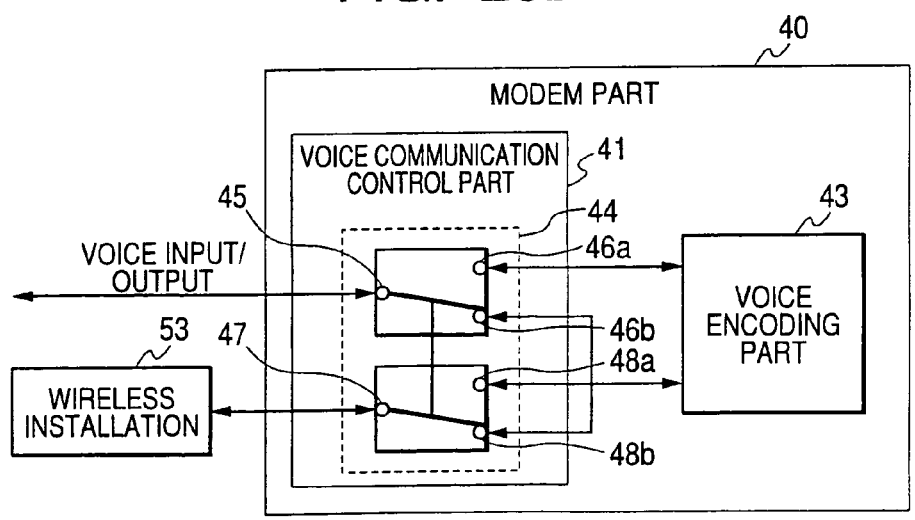

FIGS. 26A and 26B are block diagrams showing a wireless modem part of a mobile unit information sharing system according to a fifteenth preferred embodiment of the invention, FIG. 26A being a view showing a digital voice signal path and FIG. 26B a view showing an analog voice signal path.

In FIGS. 26A and 26B, the reference numbers 40, 41 and 43 denote the same parts as in FIG. 24, and the reference number 53 denotes the same part as in FIG. 1. In FIGS. 26A and 26B, bypass switching means 44 operated by a button switch is provided in the voice communication control part 41, and this bypass switching means 44 switches a voice input-output terminal 45 between a digital terminal 46a and an analog terminal 46b and switches a wireless installation terminal 47 between a digital terminal 48a and an analog terminal 48b.

This fifteenth preferred embodiment is concerned with voice transmission, and in it, at the time of voice transmission, switching between the microphone 52 and speaker 51 and the wireless modem part 40 is carried out by bypass switching means 44 of the voice communication control part 41, and either analog voice communication or digital voice communication is selected, for the voice transmission.

When transmitting voice from the own station, by a button switch being operated in accordance with the station being contacted, the bypass switching means 44 is switched between digital and analog, and when it is switched to digital, as shown in FIG. 26A, it connects the voice input-output terminal 45 to the digital terminal 46a and connects the wireless installation terminal 47 to the digital terminal 48a and thereby forms a path in which digital conversion is carried out by the voice encoding part 43. When it is switched to analog, as shown in FIG. 26B, it connects the voice input-output terminal 45 to the analog terminal 46b and connects the wireless installation terminal 47 to the analog terminal 48b and, since the analog terminal 46b and the analog terminal 48b are connected directly, thereby forms a path connecting the voice input and output to the wireless installation 53 directly.

The voice communication control part 41 is provided with a button which switches between transmitting voice as an analog signal and transmitting it as a digital signal, and when by means of this button digital voice transmission is set, in the bypass switching means 44 the bypass switches to the state shown in FIG. 26A and the voice is converted to digital by the voice encoding part 43 before being transmitted by the wireless installation 53.

When by means of the button analog voice communication is set, in the bypass switching means 44 the bypass switches to the state shown in FIG. 26B, and the voice is transmitted by the wireless installation 53 without passing through the voice encoding part 43.

With this fifteenth preferred embodiment, at times of voice communication, because communication can be switched between analog and digital in accordance with the station being contacted, introduction of the mobile unit information sharing system can be realized in stages.

Sixteenth Preferred Embodiment

A sixteenth preferred embodiment will be described with further reference to FIGS. 26A and 26B.

This sixteenth preferred embodiment is concerned with voice reception. At times of voice reception, analog voice and digital voice are automatically distinguished by the voice communication control part 41 of the wireless modem part 40 before demodulation is carried out if necessary. The analog/digital determination is made on the basis of whether there is a header part in the received information. When there is a header it is inferred that the voice signal is digital, and when there is no header it is inferred that the voice signal is analog.

In accordance with this determination, in the case of a digital voice signal, the voice communication control part 41 demodulates the digital signal to an analog signal using the path shown in FIG. 26A, and in the case of an analog voice signal, the bypass switching means 44 is automatically switched to the path shown in FIG. 26B.

With this sixteenth preferred embodiment, because when packets are received analog and digital packets of information are distinguished and demodulation carried out when necessary automatically, introduction of the mobile unit information sharing system can be realized in stages.

Seventeenth Preferred Embodiment

Figure 27:
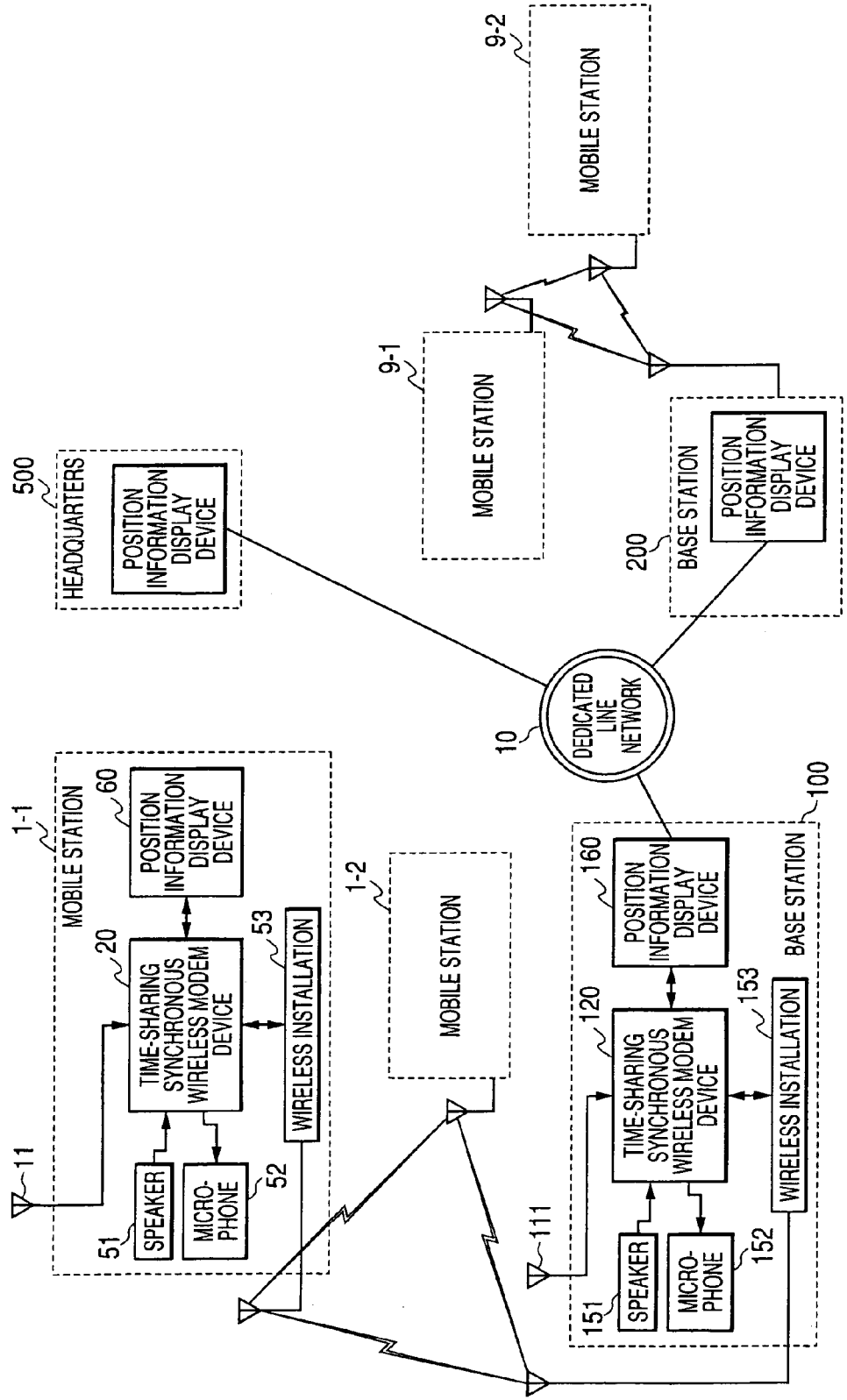
FIG. 27 is a block diagram showing a mobile unit information sharing system according to a seventeenth preferred embodiment of the invention.

FIG. 27 is a block diagram showing a mobile unit information sharing system according to a seventeenth preferred embodiment of the invention.

In FIG. 27, the reference numbers 1, 11, 20, 51 to 53, 60, 100, 111, 120, 151 to 153 and 160 denote the same parts as in FIG. 1. In FIG. 27, the position information display devices of a base station 200 and a headquarters 500 and the position information display device. 160 of a base station 100 are connected by a dedicated line network 10, and like the base station 100 the base station 200 is constructed to communicate with mobile stations 9-1, 9-2 via communication antennas.

In this seventeenth preferred embodiment, the position information display device 160 of a fixed station such as a base station 100 is connected to the position information display device of another fixed station by a communication line such as a dedicated line network 10, and information is transmitted in both directions over the dedicated line network 10.

With this seventeenth preferred embodiment, at a position information display device of a fixed station connected to the position information display device 160 of another fixed station such as a base station, the same display and control (data input and output) as the base station is possible, and information sharing and information management can be carried out over a wider range.

Eighteenth Preferred Embodiment

FIG. 28 is a flow chart showing transmission processing of information for which a transmission destination has been set in a mobile unit information sharing system according to an eighth preferred embodiment of the invention.

FIG. 29 is a flow chart showing reception processing of information for which a transmission destination has been set in a mobile unit information sharing system according to the eighth preferred embodiment of the invention.

In the foregoing first through seventeenth preferred embodiments, because a common wireless frequency is being used for the transmission of packets, if a mobile station can receive radio waves, it can receive any information about other stations. However, when all the received information is displayed on the display part of the position information display device, particularly at a mobile station, there is a risk of necessary information being buried by other information and it becoming difficult to make correct state judgements.

In this eighteenth preferred embodiment, to avoid this, when a packet is transmitted by a transmitting station, a transmission destination is set, and on the receiving side, when the own station is not included in the transmission destination, no display is shown on the display part 93 of the position information display device 60. As transmission destinations, besides the IDs of individual stations, group IDs pre-set for groups of stations can be set.

Next, using FIG. 28, transmission processing of information for which such a transmission destination is set will be described.

Information is created with the keyboard and mouse of the input-output part 70 of the position information display device 60, or local information is read out (step S41), and a transmission destination is set (step S42). Here, when the information is to be saved without being transmitted, the transmission destination is made local. Then, by the computing part 80, the transmission destination is checked (step S43) When the transmission destination is local, it is saved on a hard disk of the position information display device 60 as own station local information (step S44). If the transmission destination is other than local, the information is transmitted to the time-sharing synchronous wireless modem device 20 (step S45), and the transmitted information is stored in the shared data 92 by the computing part 80 as transmitted information, and when there is a removable medium, it is also stored in the removable medium by the computing part 30 (step S46).

In step S45, information transmitted by the computing part 80 is received by the computing part 30 of the time-sharing synchronous wireless modem device 20, and after data modulation is carried out by the wireless modem part 40 it is transmitted by the wireless installation 53 using empty communication time slots in the same way as image data.

Next, using FIG. 29, reception processing of information transmitted to a set destination will be described.

Information transmitted from the transmitting side is received by the wireless installation 53 (step S51) and demodulated by the wireless modem part 40, and the computing part 30 determines whether or not the own station ID is included in the transmission destination (step S52). If the own station ID is not included, processing ends. If the own station ID is included, the received information is transmitted to the position information display device 60 and displayed on the display part 93 (step S53), and stored as received information in the shared data 92 by the computing part 80 and, when there is a removable medium, also stored on the removable medium by the computing part 30 (step S54).

Whereas when information received from other stations is displayed on the display parts of all the position information display devices there is a risk of necessary information being buried by other information, with this eighteenth embodiment, when data transmission from a base station to specified mobile stations only is desired, or when data transmission from a mobile station to a base station only is desired, because it is not displayed on the screens of other stations, it is possible to communicate this non-shared information without hindering the business of other stations.

What is claimed is:

1. A mobile unit information sharing system including a base station and multiple mobile stations carrying out wireless communications, the base station and each of the mobile stations including:
   a wireless installation for wireless communication among the base and mobile stations using a common wireless frequency;
   a time-sharing synchronous wireless modem device for receiving self-position information of the respective station through a GPS antenna, transmitting the self-position information to the other stations via the wireless installation, and receiving position information of the other stations from the wireless installation; and
   a position information display device for receiving self-position information and other station position information from the time-sharing synchronous wireless modem device and recording the position information received as shared data and displaying the position information on a map, wherein, the time-sharing synchronous wireless modem device comprises
   a GPS receiver part for receiving self-position information through the GPS antenna,
   a wireless modem part for modulating the self-position information received by the GPS receiver part to a data form used by the wireless installation and demodulating the other station position information received by the wireless installation from the data form used by the wireless installation, and
   a first computing part for transmitting the self-position information received from the GPS receiver part and the other station position information demodulated by the wireless modem part to the position information display device and transmitting the self-position information to the other stations via the wireless installation with transmission timing determined so that communication collisions do not occur, each station sharing position information by transmitting and receiving position information to and from the other stations.

2. The mobile unit information sharing system according to claim 1, wherein the position information display device comprises a second computing part for receiving from the first computing part and recording as shared data the self-position information and the other station position information and controlling display of the positions of the stations on a map using map data and the shared data, and a display part for displaying the position information on a map under control of the second computing part.

3. The mobile unit information sharing system according to claim 1, wherein shortest transmission time and basic transmission period to be used in the transmission of the position information are set commonly in the time-sharing synchronous wireless modem devices of the base station and the mobile stations, and the first computing part transmits the self-position information with a transmission period based on the basic transmission period using communication time slot at time intervals having the shortest transmission time.

4. The mobile unit information sharing system according to claim 3, wherein the first computing part can vary the transmission period used in the transmission of the self-position information.

5. The mobile unit information sharing system according to claim 3, wherein, when transmitting high-volume data using the communication time slots, the position information display device divides the high-volume data into data divisions of a size that can be transmitted in the communication time slots, and the first computing part uses empty communication time slots not being used for the transmission of the position information to transmit the data divisions.

6. The mobile unit information sharing system according to claim 5, wherein, when among the high-volume data transmitted in divisions there is a data division that is not received normally by a receiving station, that receiving station uses an empty communication time slot to send to the transmitting station a request for re-transmission of the data division, and the first computing part of the transmitting station re-transmits the data division corresponding to the re-transmission request.

7. The mobile unit information sharing system according to claim 1, wherein the first computing part transmits an activity status of the station, appended to the self-position information.

8. The mobile unit information sharing system according to claim 7, wherein a receiving station receiving the activity status creates an activity history table for each mobile station.

9. The mobile unit information sharing system according to claim 1, wherein the position information display device comprises an input-output part having a user interface and through the first computing part transmits to the other stations object information including position and attribute obtained in the activity of the respective station and input through the input-output part, records the object information as the shared data, and displays symbol information expressing a corresponding object on a map.

10. The mobile unit information sharing system according to claim 9, wherein the object information input through the input-output part is linked to image data corresponding to the object and the object information linked with the image data is transmitted to other stations.

11. The mobile unit information sharing system according to claim 1, including a removable storage medium in the first computing part, wherein the shared data is held in the removable storage medium.

12. The mobile unit information sharing system according to claim 1, wherein the common wireless frequency is used for voice communications, and, when there is voice information to be transmitted to another station, the first computing part transmits the voice information with highest priority.

13. The mobile unit information sharing system according to claim 12, wherein the first computing part transmits the self-position information appended to a trailing end of the voice information.

14. The mobile unit information sharing system according to claim 12, wherein the first computing part encrypts the voice information.

15. The mobile unit information sharing system according to claim 12, wherein the wireless modem part includes switching means for selecting either an analog voice signal or a digital voice signal and, at a station transmitting voice information, the switching means is switched by an operator and, at a receiving station receiving voice information, analog voice signals and digital voice signals are automatically distinguished and the switching means accordingly switched in the wireless modem part.

16. The mobile unit information sharing system according to claim 1, wherein the first computing part encrypts the information to be transmitted and has a changing encryption key used in the encryption.

17. The mobile unit information sharing system according to claim 1, wherein the position information display device of the base station is connected by network to the position information display device of another base station, and, by exchanging of shared data between base stations, position information of the mobile stations is displayed by the position information display device of the other base station.

18. The mobile unit information sharing system according to claim 1, wherein when the first computing part transmits information, the first computing part designates a transmission destination, and the receiving stations choose information to confirm reception.

* * * * *